US012238131B2

(12) United States Patent
Finley et al.

(10) Patent No.: US 12,238,131 B2
(45) Date of Patent: Feb. 25, 2025

(54) CONTROL ASSESSMENT SYSTEMS, METHODS AND PROGRAM PRODUCTS

(71) Applicant: U.S. Bank National Association, Minneapolis, MN (US)

(72) Inventors: Daniel G. Finley, Milwaukee, WI (US); Joshua M. Henrich, Maple Grove, MN (US); Michael S. Iacolino, Crystal, MN (US); Toni J. Moore, Charlotte, NC (US)

(73) Assignee: U.S. Bank National Association, Minneapolis, MN (US)

( * ) Notice: Subject to any disclaimer, the term of this patent is extended or adjusted under 35 U.S.C. 154(b) by 322 days.

(21) Appl. No.: 17/824,323

(22) Filed: May 25, 2022

(65) Prior Publication Data

US 2023/0388331 A1   Nov. 30, 2023

(51) Int. Cl.
*H04L 9/40* (2022.01)
(52) U.S. Cl.
CPC ...... *H04L 63/1433* (2013.01); *H04L 63/1416* (2013.01); *H04L 63/1425* (2013.01)
(58) Field of Classification Search
CPC ............ H04L 63/14–1491; G06F 21/577
See application file for complete search history.

(56) References Cited

U.S. PATENT DOCUMENTS 9,912,683 B2 * 3/2018 Cam ............... H04L 63/1433
11,552,854 B2 * 1/2023 Aggarwal ........... H04L 45/22
2014/0257917 A1 * 9/2014 Spencer ........... G06Q 10/0635
 705/7.28
2021/0133331 A1 * 5/2021 Lipkis ............... H04L 63/1483
2021/0352099 A1   11/2021 Rogers

FOREIGN PATENT DOCUMENTS

CN           113408921 A        9/2021

OTHER PUBLICATIONS

Muckin, Michael, and Scott C. Fitch. "A threat-driven approach to cyber security." Lockheed Martin Corporation (2014). (Year: 2014).*

(Continued)

*Primary Examiner* — Madhuri R Herzog
(74) *Attorney, Agent, or Firm* — Merchant & Gould P.C.

(57) ABSTRACT

Methods, systems, and computer program products are provided for improving a network by modeling control strength of network nodes. Design and implementation (DIS) scores are calculated for each of a plurality of nodes. An initial strength (InitCS) corresponding to any control performed by the node is determined. n-subgraphs are generated based on a network graph. For each node in the subgraph of the n-subgraphs, a modified control strength (ModCS) corresponding to a combination of the InitCS, a weakening factor derived from a combination of a ModCS of a plurality of upstream nodes, and a reliance coefficient (RC) of each node-to-node relationship of the plurality of upstream nodes, is determined. A risk mitigation process is performed based, in part, on any one or a combination of: DIS, InitCS and ModCS.

20 Claims, 15 Drawing Sheets

(56) References Cited

OTHER PUBLICATIONS

Carolyn Dittmeier CIA CRMA and Paolo Casati CIA CRMA, "Evaluating Internal Control Systems," IIARF Research Report, 2014, The Institute of Internal Auditors Research Foundation (IIARF), Alamonte Springs, FL (65 pgs.), www.theiia.org/research.

"Measuring aggregated control strength when quantifying risk," article by Mike Y., Cyber Risk Modelling and Quantification Manager at KPMG, published on LinkedIn on Oct. 1, 2020 at https://www.linkedin.com/pulse/measuring-aggregated-control-strength-when-quantifying-m-y-.

* cited by examiner

| Reliance Coefficient (RC) Ratings | |
|---|---|
| 0 | No control Impact |
| 0.02 | Near no Control Reliance. Minor Deviations in the Upstream Process's Controls will have an Unnoticeable but Non-zero effect on the Downstream Process's Controls |
| 0.1 | Immaterial Control Reliance. Significant Deviations in the Upstream Process's Controls will have a Small Effect on the Downstream Process's Controls |
| 0.2 | Low Control Impact. Significant Deviations in the Upstream Process's Controls will have a Small Effect on the Downstream Process's Controls. |
| 0.3 | (Between .2 and .4) |
| 0.4 | Material Control Impact. Deviations in the Upstream Process's Controls will Generally Affect the Downstream Process's Controls in a Noticeable Way |
| 0.5 | (Between .4 and .6) |
| 0.6 | Very Material Control Impact. Deviations in the Upstream Process's Controls will Largely Impact the Downstream Process's Controls (Cause Scope of Coverage Problems, etc.) |
| 0.7 | (Between .6 and .8 Definitions) |
| 0.8 | Critical Impact. Deviations in the Upstream Process's Controls will Render the Downstream Process's Control Mostly Obsolete. The Downstream Process is Almost Completely Reliant on the Controls in the Upstream Process |
| 0.9 | (Between .8 and 1 Definitions) |
| 1 | Completely Dependent. Failures in Upstream Process' Controls have a 1 for 1 Impact in the Downstream Process's Controls |

FIG. 7

Scope of Coverage (SoC) Ratings — 900

| | Scope of Coverage (SoC) Ratings |
|---|---|
| 0 | Current Scope of Coverage Not Measurable; Or Intended Scope of Coverage not Defined |
| 1 | Significant Gaps Against the Intended Scope (Less than 70% Covered) |
| 2 | Some Gaps Against the Intended Scope (More than 70% Covered) |
| 3 | Optimized Coverage of Intended Scope (More than 95% Covered), with Controls in Place to Ensure Coverage |

Scope of Coverage (SoC) Ratings — 902

| | Scope of Coverage (SoC) Ratings |
|---|---|
| 0 | Current Scope of Coverage Not Measurable; Or Intended Scope of Coverage not Defined |
| 1 | Intended Scope is Defined and Reasonable, but Controls Don't exist to Ensure Intended Scope is Covered and Significant Known Gaps Against Intended Scope Exist |
| 2 | Intended Scope is Defined and Reasonable, But one of the 2 Following Criteria are Met:<br>- Controls Don't Exist to Ensure Intended Scope is Covered, But no Known Gaps Exist, or Known Gaps are Immaterial<br>- Controls Exist to Ensure Intended Scope is Covered, But there are Known Moderate Gaps in Coverage |
| 3 | Intended Scope is Defined and Reasonable, Controls Exist to Ensure that the Intended Scope is Covered, and no Known Gaps in Coverage Exist |

FIG. 9

| Scope of Coverage (SoC) Ratings | |
|---|---|
| 0 | No Documented Controls; Or Controls do Not Meet BLCE or Type Requirements |
| 1 | Controls Meet BLCE or Type Requirements, But not Both |
| 2 | Controls Meet Both BLCE and Type Requirements |
| 2.5 | Controls Meet Both BLCE and Type Requirements, And are Monitored with Metrics |
| 3 | Controls Meet Both BLCE and Type Requirements, And are Monitored with Metrics that are Included in Integrated Reporting |

FIG. 10

| Item Local Impact Score (ILIS) Ratings | | Risk Manager Action Expected |
|---|---|---|
| 0 | No control Impact | None |
| 0.02 | Immaterial but Non-zero Impact | None |
| 0.05 | Very Low Level of Impact – existing Controls need to be Tuned to Fix | - Evaluate if CMT Ticket needs to be Submitted to Address Control Tuning |
| 0.10 | Low Impact – localized to One Secondary Control that is Clearly not Operating Effectively, or as Designed | - Ensure RP Addresses Ineffective Control<br>- Ensure Issue Record Maps to Impacted Control<br>- Submit CMT Ticket to Address Control Changes |
| 0.20 | Moderate Level of Impact – localized to One Primary Control, or Two Secondary Controls that are Clearly not Operating Effectively or as Designed, Resulting in Low-to-Moderate Levels of Unmitigated Residual Risk | - Ensure RP Addresses Ineffective Control<br>- Ensure Issue Record Maps to Impacted Control(s)<br>- Submit CMT Ticket to Address Control Changes<br>- Evaluate Aligned Risk Record(s) to Determine if Effectiveness Should be Downgraded* |
| 0.30 | Moderate Level of Impact – at Least One Key Control is Missing or is not Operating as Designed, Resulting in Moderate Levels of Unmitigated Risk | - Ensure RP Addresses Ineffective Control<br>- Ensure Issue Record Maps to Impacted Control(s)<br>- Submit CMT Ticket to Address Control Changes<br>- Submit CMT Ticket to Address Missing Controls<br>- Evaluate Aligned Risk Record(s) to Determine if Effectiveness Should be Downgraded* |
| 0.40 | High Level of Impact – Two or More Key Controls are Missing or are not Operating as Designed, Resulting in High Levels of Unmitigated Risk | - Ensure RP Addresses Ineffective Control<br>- Ensure Issue Record Maps to Impacted Control(s)<br>- Submit CMT Ticket to Address Control Changes<br>- Submit CMT Ticket to Address Missing Controls<br>- Downgrade Effectiveness of Related Risk Records* |
| 0.50 | Extreme Impact – Processes or Controls Cannot be Reasonably Relied on Based on the Gaps Identified | - Ensure RP Addresses Ineffective Control<br>- Ensure Issue Record Maps to Impacted Control(s)<br>- Submit CMT Ticket to Address Control Changes<br>- Submit CMT Ticket to Address Missing Controls<br>- Downgrade Effectiveness of Related Risk Records* |
| 1 | Processes or Controls are Mitigating no Risk based on the Issue Identified | - Ensure RP Addresses Ineffective Control<br>- Ensure Issue Record Maps to Impacted Control(s)<br>- Submit CMT Ticket to Address Control Changes<br>- Submit CMT Ticket to Address Missing Controls<br>- Downgrade Effectiveness of Related Risk Records* |

FIG. 11

CONTROL ASSESSMENT SYSTEMS, METHODS AND PROGRAM PRODUCTS

TECHNICAL FIELD

Example aspects described herein relate generally to architecture risk assessment, and more particularly to systems, methods and computer program products for minimizing network architectural design failures through analysis of control strengths.

BACKGROUND

A particular class of technical problems in architecture risk assessment (e.g., cybersecurity risk assessment, enterprise risk management, etc.) relate to modeling a network and understanding and intervening in the processes associated with the network's various interrelated nodes. Measuring control strength is a particular technical problem that few information risk assessment methodologies address. Typically, measuring the control strength of a particular control involves measuring the control's relevance, implementation, and effectiveness. A control's relevance is a metric that quantifies how capable the control is with respect to a particular task such as, for example, stopping a threat. A control's implementation is a metric that quantifies whether the control has been put in place. A control's effectiveness is a metric that quantifies whether the control is doing what it is supposed to do. The control strength of the particular control can then be determined by multiplying these three metrics together, using equation (1) below:

Control strength=Relevance×Implementation×Effectiveness (1)

Calculating the combined control strength of multiple controls (also referred to as aggregated control strength) is useful for mitigating threats. The calculation involves selecting multiple controls that are in-scope and relevant to a particular loss event, multiplying a particular control strength by the control's relevance, summing this score for the individual control together with the scores for all the controls that are in-scope and relevant, and dividing the figure produced by the sum of all the relevance scores for the in-scope and relevant controls.

While useful, the above-described mechanism for determining aggregated control strength is limited in how well it provides an understanding of, for example, how individual nodes in a network impact each other and hence lacks the ability to identify particular nodes that can be improved. Understanding what failures in one area do to other areas both quantitatively/qualitatively would help prevent failures and aid in improving overall operation of an enterprise architecture. One technical challenge in preventing failures is the ability to accurately provide risk ratings or risk rates based on the ultimate downstream impact of an upstream node where, for example, the node represents a process. Another technical challenge relates to determining which issues should be the primary focus for remediation. It would be useful therefore to have a mechanism that provides an accurate picture of the aggregate risk in an environment. It would also be useful to measure full stack risk data and interdependencies of the technology/security control environment.

SUMMARY OF THE INVENTION

The example embodiments described herein meet the above-identified needs by providing methods, systems, and computer program products for modeling control strength of network nodes of a network. In an example embodiment, a method for modeling control strength of network nodes of a network includes receiving a network graph having a plurality of nodes; receiving, for each node: a risk and requirement design (RRD) rating corresponding to how well a set of controls within the node covers at least one risk for the node, a scope of coverage (SoC) rating corresponding to how well the set of controls within the node covers an intended scope of the node, a process and control design (PCD) rating corresponding to how well the set of controls within the node is designed, and a definition weight (Def Weight) corresponding to the RRD, a scope weight (Scope Weight) corresponding to the SoC rating, and a design weight (Design Weight) corresponding to the PCD rating. The method further includes determining a leveling factor according to a maximum possible score of the RRD rating, the SoC rating, and the PCD rating; calculating a design and implementation (DIS) score for each of the plurality of nodes according to:

$$DIS = \frac{RRD*(Def \text{ Weight}) + SoC*(\text{Scope Weight}) + PCD*(\text{Design Weight})}{\text{Leveling Factor}};$$

and causing a risk mitigation process to be performed on at least one of the plurality of nodes based, in part, on DIS.

In some embodiments, the method further includes determining a ranking of node sensitivities for each node based, in part, on DIS, where the risk mitigation process is based on the ranking.

In some embodiments, the method further includes receiving an item local impact score (ILIS) rating representing how impactful documented issues are to the set of controls within the node; and calculating an initial control strength (InitCS) according to:

$$InitCS = DIS * \prod_{i=1}^{n}(1 - ILIS_i)$$

where the initial control strength (InitCS) corresponds to all controls performed by the node; and causing a risk mitigation process to be performed on at least one of the plurality of nodes based, in part, on InitCS.

In some embodiments, the method further includes: determining a ranking of node sensitivities for each node based, in part, on InitCS, where the risk mitigation process is based on the ranking.

In some embodiments, the method further includes: generating n-subgraphs based on the network graph, where n is a number of nodes in the network graph; and calculating, for each node in a subgraph of the n-subgraphs, a modified control strength (ModCS) corresponding to a combination of the InitCS, a weakening factor derived from a combination of a ModCS of a plurality of upstream nodes, and a reliance coefficient (RC) of each node-to-node relationship of the plurality of upstream nodes.

In some embodiments, the method further includes: receiving a reliance coefficient (RC) rating representing a reliance of the node on a set of controls of upstream nodes to execute the set of controls of the node; calculating a modified control strength (ModCS) according to:

$$ModCS_p = InitCS_p - \frac{\sum_{i=1}^{n}\left[InitCS_p * (1 - ModCS_{pi-1}) * RC_{pi}^2\right]}{\sum_{i=1}^{n} RC_{pi}}$$

where $ModCS_p$ represents a strength of a node (p) in the network graph, p–1 represents the plurality of upstream nodes, the plurality of upstream nodes being limited to upstream nodes in the subgraph being tested; and causing a risk mitigation process to be performed on at least one of the plurality of nodes based, in part, on $ModCS_p$.

In some embodiments, the method further includes determining a ranking of node sensitivities for each node based, in part, on $ModCS_p$, where the risk mitigation process is based on the ranking.

In some embodiments, the method further includes calculating, for each node (p) of the plurality of nodes an impact score (IS) according to:

$$IS_p = ModCS_p - InitCS_p$$

where the impact score (IS) corresponds to an impact by at least one existing upstream deficiency on a node in the network graph.

In some embodiments, the method further includes calculating a modified control strength (ModCS) value for each node in the network graph, thereby generating a plurality of node ModCS values; averaging the plurality of node ModCS values to obtain an original average ModCS; adjusting a score associated with a selected node in the network graph, thereby generating an adjusted score; recalculating the original average ModCS using the adjusted score to obtain an augmented ModCS; subtracting the original average ModCS from the augmented ModCS average to determine a sensitivity rating for the selected node; performing the adjusting, recalculating and subtracting for each node in the network, thereby generating a plurality of sensitivity ratings; and ranking each node in the network graph according to the plurality of sensitivity ratings.

In some embodiments, there is provided a system for modeling control strength of network nodes in a network including a control assessment system configured to: receive a network graph having a plurality of nodes; receive, for each node: a risk and requirement design (RRD) rating corresponding to how well a set of controls within the node covers at least one risk for the node, a scope of coverage (SoC) rating corresponding to how well the set of controls within the node covers an intended scope of the node, a process and control design (PCD) rating corresponding to how well the set of controls within the node is designed, and a definition weight (Def Weight) corresponding to the RRD, a scope weight (Scope Weight) corresponding to the SoC rating, and a design weight (Design Weight) corresponding to the PCD rating. The control assessment system is further configured to determine a leveling factor according to a maximum possible score of the RRD rating, the SoC rating, and the PCD rating; calculate a design and implementation (DIS) score for each of the plurality of nodes according to:

$$DIS = \frac{RRD * (Def \text{ Weight}) + SoC * (\text{Scope Weight}) + PCD * (\text{Design Weight})}{\text{Leveling Factor}}$$

and cause a risk mitigation process to be performed on at least one of the plurality of nodes based, in part, on DIS.

In some embodiments, the control assessment system is further configured to determine a ranking of node sensitivities for each node based, in part, on DIS, where the risk mitigation process is based on the ranking.

In some embodiments, the control assessment system is further configured to receive an item local impact score (ILIS) rating representing how impactful documented issues are to the set of controls within the node; and calculate an initial control strength (InitCS) according to:

$$InitCS = DIS * \prod_{i=1}^{n}(1 - ILIS_i)$$

where the initial control strength (InitCS) corresponds to all controls performed by the node; and cause a risk mitigation process to be performed on at least one of the plurality of nodes based, in part, on InitCS.

In some embodiments, the control assessment system is further configured to: determine a ranking of node sensitivities for each node based, in part, on InitCS, where the risk mitigation process is based on the ranking.

In some embodiments, the control assessment system is further configured to generate n-subgraphs based on the network graph, where n is a number of nodes in the network graph; and calculating, for each node in a subgraph of the n-subgraphs, a modified control strength (ModCS) corresponding to a combination of the InitCS, a weakening factor derived from a combination of a ModCS of a plurality of upstream nodes, and a reliance coefficient (RC) of each node-to-node relationship of the plurality of upstream nodes.

In some embodiments, the control assessment system is further configured to receive a reliance coefficient (RC) rating representing a reliance of the node on a set of controls of upstream nodes to execute the set of controls of the node; calculate a modified control strength (ModCS) according to:

$$ModCS_p = InitCS_p - \frac{\sum_{i=1}^{n}\left[InitCS_p * (1 - ModCS_{pi-1}) * RC_{pi}^2\right]}{\sum_{i=1}^{n} RC_{pi}}$$

where $ModCS_p$ represents a strength of a node (p) in the network graph, p–1 represents the plurality of upstream nodes, the plurality of upstream nodes being limited to upstream nodes in the subgraph being tested; and cause a risk mitigation process to be performed on at least one of the plurality of nodes based, in part, on $ModCS_p$.

In some embodiments, the control assessment system is further configured to determine a ranking of node sensitivities for each node based, in part, on $ModCS_p$, where the risk mitigation process is based on the ranking.

In some embodiments, the control assessment system is further configured to calculate, for each node (p) of the plurality of nodes an impact score (IS) according to:

$$IS_p = ModCS_p - InitCS_p$$

where the impact score (IS) corresponds to an impact by at least one existing upstream deficiency on a node in the network graph.

In some embodiments, the control assessment system is further configured to calculate a modified control strength (ModCS) value for each node in the network graph, thereby generating a plurality of node ModCS values; average the plurality of node ModCS values to obtain an original average ModCS; adjust a score associated with a selected node in the network graph, thereby generating an adjusted score; recalculate the original average ModCS using the adjusted score to obtain an augmented ModCS; subtract the original average ModCS from the augmented ModCS average to determine a sensitivity rating for the selected node; perform the adjusting, recalculating and subtracting for each node in the network, thereby generating a plurality of sensitivity ratings; and rank each node in the network graph according to the plurality of sensitivity ratings.

In some embodiments, there is provided a non-transitory computer-readable medium having stored thereon sequences of instructions, the sequences of instructions including instructions which when executed by one or more processors causes the at least one or more processors to perform the methods disclosed herein.

BRIEF DESCRIPTION OF DRAWINGS

The features and advantages of the example embodiments of the invention presented herein will become more apparent from the detailed description set forth below when taken in conjunction with the following drawings.

FIG. 7 illustrates example reliance coefficient ratings according to an example embodiment.

FIG. 9 illustrates two example scope of coverage (SoC) ratings according to an example embodiment.

FIG. 10 illustrates example process and control design (PCD) ratings according to an example embodiment.

FIG. 11 illustrates example item local impact score (ILIS) ratings according to an example embodiment.

DETAILED DESCRIPTION

Figure 1:
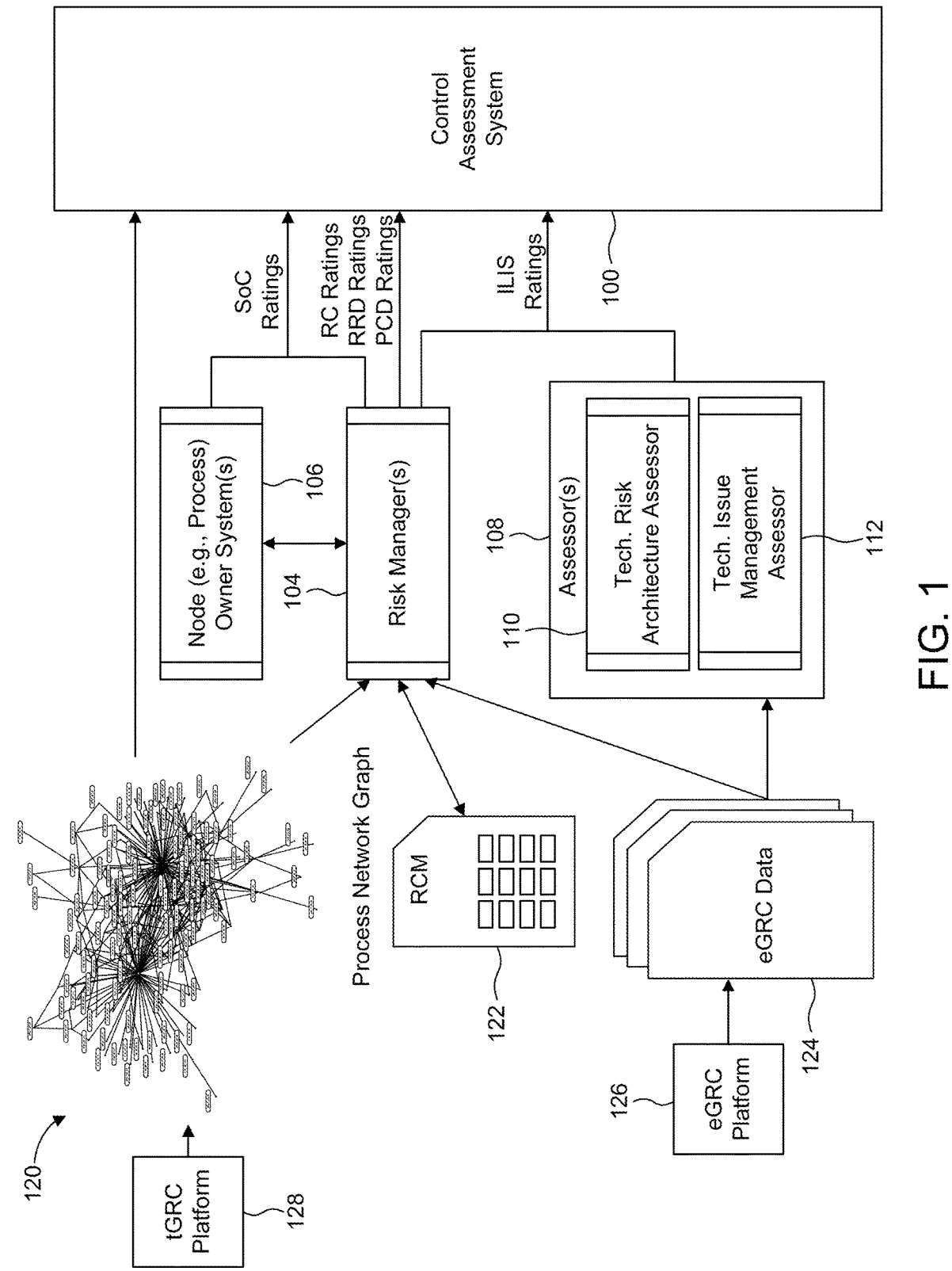
FIG. 1 is a diagram of a control assessment environment including a control assessment system in communication with sources of data in accordance with an example embodiment.

Generally, aspects of the embodiments described herein determine control effectiveness scores for individual nodes derived from relationships between various nodes in a network. Aspects of the embodiments described herein also model the effects of an issue or finding on the broader strength of the control environment. Optimal remediation targets are, in turn, determined by identifying which issues, findings or combinations of issues and/or findings result in the greatest reduction in residual risk. In addition, a high-level picture of the effectiveness to the overall control environment can be visualized through an interface. These features enable finding, understanding, evaluating, and prioritizing risks associated with individual nodes or groups of interrelated nodes, as well as remediation.

The procedures according to some embodiments described herein include sub-assessments of the adequacy of a node in a network. The results of those sub-assessments are fed through a series of calculations to arrive at two sets of scores, referred to as initial control strength (InitCS) and modified control strength (ModCS).

Initial control strength (InitCS) as used herein is an isolated effectiveness rating of a suite of controls performed by a node. InitCS can be used to prioritize improvement efforts throughout the network.

Modified control strength (ModCS), as used herein, is the control effectiveness of a node after considering weaknesses associated with certain upstream nodes. ModCS is primarily used to understand how nodes within the network impact each other and to identify where critical nodes are adversely affected by less critical upstream nodes.

The example embodiments presented herein are described herein in terms of an example network of technology services control processes with varying degrees of relationships. This description is not intended to limit the application of the example embodiments presented herein. In fact, after reading the following description, it will be apparent to one skilled in the relevant art(s) how to implement the following example embodiments in alternative embodiments, e.g., involving an architecture network corresponding to an environment in which assets or controls within the environment can be compromised or otherwise cause a reduction in effectiveness.

A graph, or network graph, as used herein is a mathematical structure used to model pairwise relations between objects. Points are represented as nodes (also referred to sometimes as vertices) that are linked by edges (also referred to sometimes as links). A starting point within a graph is a point for which control strength is determined in relation to certain other nodes within the graph. As used herein, a node can represent any type of datapoint associated with a network, technology, process or organization. A node can be dependent on other nodes (upstream or downstream nodes). Downstream nodes may have varying reliance on an upstream node.

While some of the example embodiments presented herein are directed to methods, systems and computer program products for measuring control strength of processes represented in a process network graph, this description is not intended to limit the application of the example embodiments presented herein. In fact, after reading the following description, it will be apparent to one skilled in the relevant art(s) how to implement the following example embodiments in alternative embodiments that measure control strength for datapoints, systems, devices or components represented by a network graph. Accordingly, the example embodiments described herein that are implemented for use with a process network graph can be implemented using network graphs having nodes representing components (e.g., devices) associated with other types of networks and system architectures.

FIG. 1 is a diagram of a control assessment environment including a control assessment system 100 in communication with sources of data in accordance with an example embodiment. In some embodiments, several sub-assessments are performed by components in communication with the control assessment system 100, including, for example, one or more risk managers 104, one or more node owner systems 106, a technology risk architecture assessor 110, and a technology issue management assessor 112. The technology risk architecture assessor 110 and the technology issue management assessor 112 are sometimes collectively referred to herein as assessors 108.

The results of the sub-assessments performed by the one or more risk managers 104, one or more node owner systems such as node owner systems 106, technology risk architecture assessor 110, and technology issue management assessor 112 are received by the control assessment system 100 which, in turn, performs a series of procedures to generate two sets of scores that provide quantitative measurements of control strength: initial control strength (InitCS) and modified control strength (ModCS).

In some embodiments, the one or more risk managers 104, the one or more node owner systems 106, the technology risk architecture assessor 110, technology issue management assessor 112, or any combination of the foregoing, are implemented as user interfaces for receiving applicable data input. In some implementations, data obtained from the one or more risk managers 104, the one or more node owner systems 106, the technology risk architecture assessor 110, the technology issue management assessor 112, or any combination of the foregoing is fed to control assessment system 100 via an input/output interface 206 (described below in connection with FIG. 2). In some implementations, data is input to an intermediary platform, e.g., a technology governance, risk, and compliance (tGRC) platform 128, which in turn feeds the data to control assessment system 100.

To perform the sub-assessments, in an example implementation, the one or more risk managers 104, one or more node owner systems 106, technology risk architecture assessor 110, and technology issue management assessor 112 obtain data from various data sources including a process network graph 120, a risk and control matrix (RCM) 122, and issue data referred to as eGRC data 124.

Figure 6:
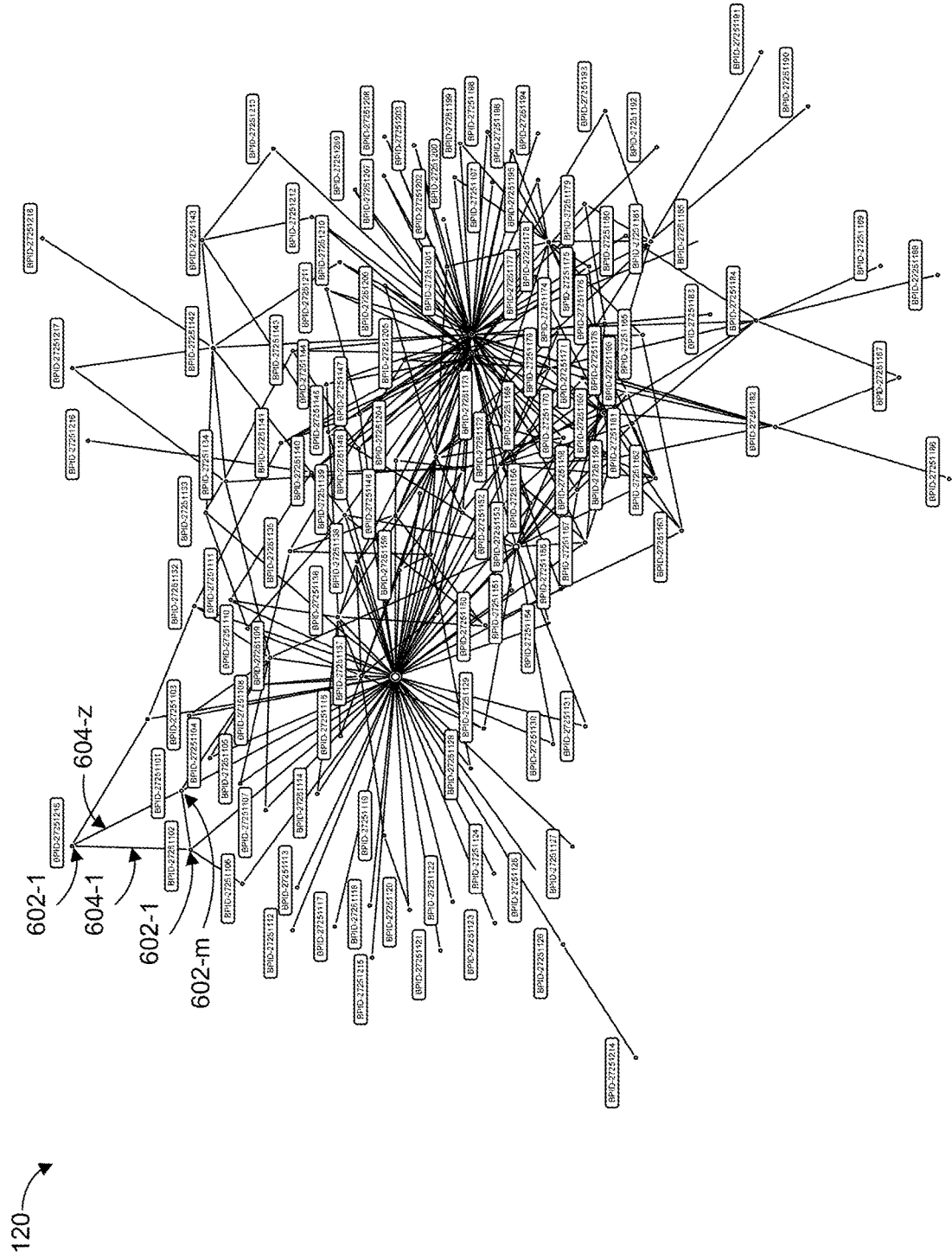
FIG. 6 is an example network graph illustrating an ecosystem within an information technology infrastructure.

A process network graph 120 is a network graph that depicts how technology services in control processes relate to each other and the strength of each relationship in the network. As shown in FIG. 1, the process network graph 120, in some embodiments, is fabricated by a technology governance, risk, and compliance (tGRC) platform 128. FIG. 6 is an example network graph illustrating an ecosystem within an information technology infrastructure. In this example implementation, the network graph is a process network graph 120. Individual processes 602 are represented by the small rectangles. In an example implementation, the individual processes 602 can be represented using alphanumeric identifiers (e.g., BPID-28257896). Processes 602-1, 602-2, . . . , 602-m can be linked to each other as illustrated by connectors 604-1, . . . , 604-z (also referred to as links). The level of reliance is quantitatively represented by a reliance coefficient (RC) described in more detail below.

Referring again to FIG. 1, a risk and control matrix (RCM) 122 is a process-focused interface that illustrates, for example, a suite of controls being performed by the process, how the controls align to a business's internal risk framework, the intended and current scope of the process, and information about the process, the controls, and other risk related details. In an example implementation, the RCM 122 provides risk-to-control mappings. An RCM 122, in an example implementation, is a set of reports designed to describe the controls performed within a process, and how those controls relate to various internal and external frameworks. In an example implementation, one or more risk managers 104 continuously maintain the set of reports and store them on the RCM 122. Each RCM 122 is a representation of a process (i.e., an individual node in the process network graph 120).

The eGRC data 124 contains a population of formally documented issues with one or more processes executed on the network. In some embodiments, eGRC data 124 is obtained from an enterprise governance, risk, and compliance platform (eGRC) 126.

In some embodiments, one or more risk managers 104 receives the process network graph 120 and generates reliance coefficient (RC) ratings. Generally, RC ratings can be used to determine the impact of any deficiencies in upstream nodes (e.g., processes) on the related downstream nodes (e.g., processes). In an example implementation, each RC is a rating, from 0-1, representing how much a node (e.g., a process) in a network graph (e.g., the process network graph 120) relies on upstream nodes' (e.g., processes') controls to effectively execute its controls. A connection between any two nodes (e.g., processes) may have a reliance coefficient of zero if the nodes (e.g., processes) are connected in a way that does not represent downstream reliance on an upstream nodes' (e.g., processes') controls. FIG. 7 illustrates example reliance coefficient (RC) 700 ratings according to an example embodiment.

Figure 8:
FIG. 8 illustrates example risk and requirement design (RRD) ratings according to an example embodiment.

In some embodiments, one or more risk managers 104 obtains risk-to-control mappings from the RCM 122 and uses the risk-to-control mappings to produce risk and requirement design (RRD) ratings. In an example implementation, the RRD ratings are on a 0-3 rating scale indicating how well the suite of controls within a node (e.g., a process) covers relevant risks. Stated differently, an RRD rating corresponds to how well a plurality of controls within a node under test covers at least one risk for that node. FIG. 8 illustrates example risk and requirement design (RRD) ratings 800 according to an example embodiment.

In some embodiments, one or more risk managers 104 together with the one or more node owner systems 106 generate scope of coverage (SoC) ratings using node scoping information, which in this example implementation is process scoping information, received from the RCM 122. In this example implementation, process scoping information is a description of what types of assets or technology (ies) a process covers. Controls within a process act on a technology type (e.g., servers, endpoints, product data management (PDM) systems for managing design data and engineering processes, and the like). Thus, what a process covers depends, at least in part, on the technology type. If, for example, a process covers servers, then the controls within the process being examined would act upon servers. If, for example, a process covers endpoints, then the controls within the process being examined would act upon endpoints. In another non-limiting example, a control might cause data within a technology to be encrypted. The technology type could be, for example, servers, endpoints, a PDM system, and the like.

In an example implementation, each of the SoC ratings is a rating between 0-3 indicating how well a suite of controls within the node (e.g., process) covers the intended scope of the node (e.g., process). Stated differently, an SoC rating corresponds to how well the set of controls within the node covers the intended scope of the node. FIG. 9 illustrates two example scope of coverage (SoC) ratings according to an example embodiment. The first SoC ratings 900 are ratings for which it is possible to estimate or calculate coverage as a percentage. For some nodes (e.g., processes), it may not be possible to estimate or calculate coverage as a percentage. If a determination is made that it is not possible to estimate or calculate coverage as a percentage, second SoC ratings 902 can be used as an alternative scale.

In some embodiments, the one or more risk managers 104 also generates process and control design (PCD) rating data, referred to as PCD ratings. In an example implementation, each of the PCD ratings is a rating between 0-3 rating of how well a suite of controls within a node (e.g., a process) is designed. FIG. 10 illustrates example process and control design (PCD) ratings 1000 according to an example embodiment. In some embodiments, the PCD ratings 1000 are provided by the RCM 122.

In some embodiments, a risk manager 104 can be a user interface that receives input from an operator, where the information input is subjective rating data. In some embodiments, the risk manager 104 can be a user interface that receives input from an operator, where the information input is objective rating data. In some embodiments, a risk manager 104 can be an automated component that receives data from one or more electronic sources and generates quantified rating data based on the input data from the one or more electronic sources. RRD ratings, SoC ratings and PCD ratings are collectively referred to herein as design metrics. RRD ratings, SoC ratings and PCD ratings can be used to determine a design and implementation score (DIS) as described below in more detail.

In some embodiments, the one or more risk managers 104, the technology risk architecture assessor 110, and the technology issue management assessor 112 cooperate to generate an item local impact score (ILIS). In some embodiments, ILIS is received directly from the eGRC platform 126.

In an example implementation, an ILIS is a 0-1 rating indicating how impactful documented issues are to a suite of controls within the node (e.g., process). FIG. 11 illustrates example item local impact score (ILIS) ratings 1100 according to an example embodiment.

The results of the above sub-assessments are obtained by the control assessment system 100 and stored. In turn, control assessment system 100 performs a series of calculative procedures, yielding a set of scores and metrics. In some embodiments, the calculations and procedures that yield the scores and metrics are automated as described herein.

Figure 2:
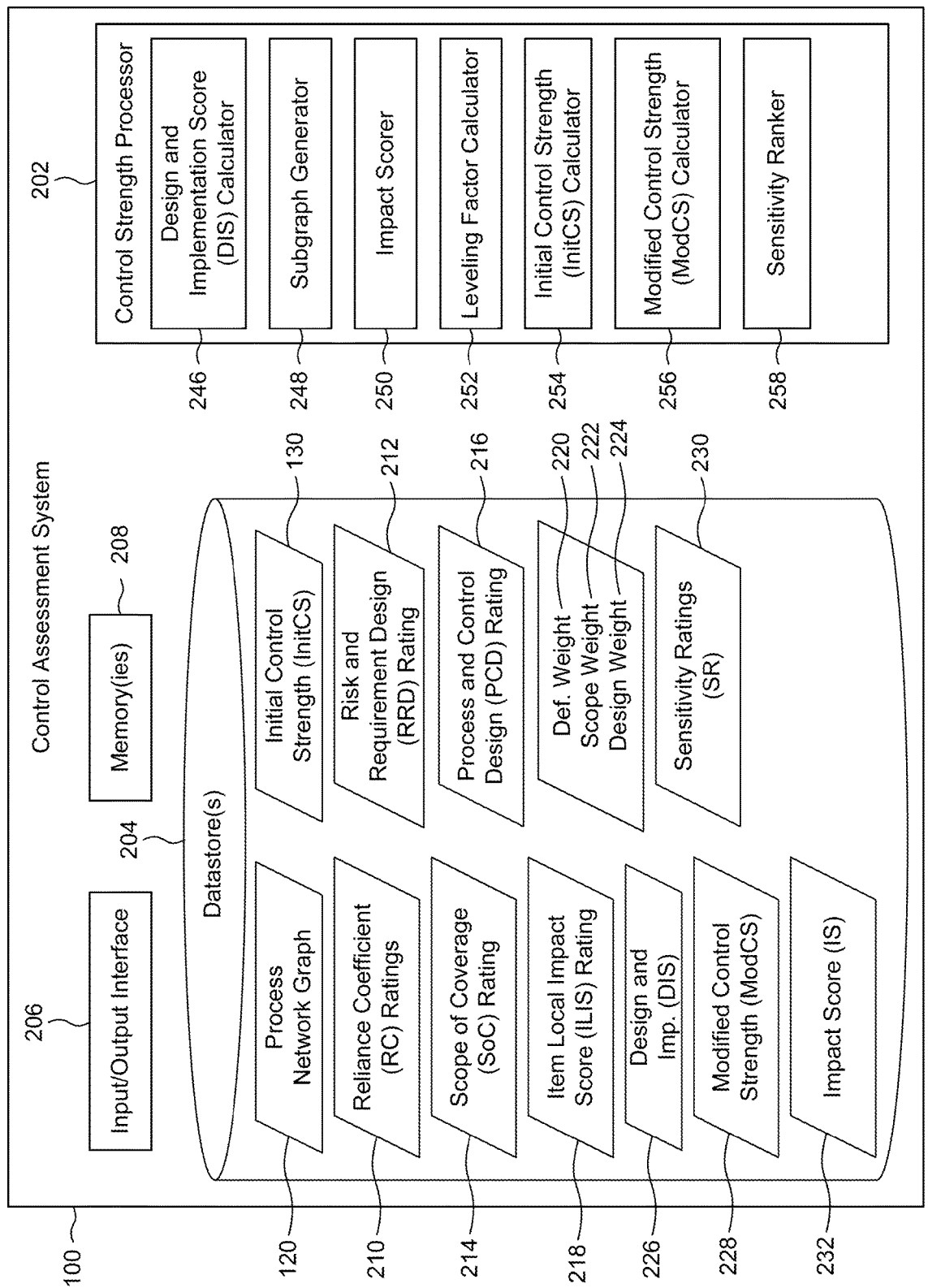
FIG. 2 illustrates a control assessment system in accordance with an example embodiment.

FIG. 2 illustrates a control assessment system 100 in accordance with an example embodiment. As shown in FIG. 2, control assessment system 100 includes a control strength processor 202, one or more datastore 204, an input/output interface 206, and one or more memories 208. The control strength processor 202 includes a design and implementation score (DIS) calculator 246, a subgraph generator 248, an impact scorer 250, a leveling factor calculator 252, an initial control strength (InitCS) calculator 254, a modified control strength (ModCS) calculator 256, and a sensitivity ranker 258.

In some embodiments, the control assessment system 100 operates to calculate a design and implementation score (DIS), an initial control strength (InitCS), a modified control strength (ModCS), an impact score (IS) 232, and sensitivity ratings (SR) 230.

Control assessment system 100 also operates to receive risk and requirement design (RRD) ratings 212, scope of coverage (SoC) ratings 214, process and control design (PCD) ratings 216, item local impact score (ILIS) ratings 218, definition weights (Def Weight) 220 corresponding to the RRD ratings 212, scope weights (Scope Weight) 222 corresponding to the SoC ratings 214, and design weights (Design Weight) 224 corresponding to the PCD ratings 216.

A definition weight 220 corresponds to the RRD rating 212, a scope weight 222 corresponds to the SoC rating, and a design weight 224 corresponds to the PCD rating.

Datastore 204 can be any type of repository for storing, managing and distributing data sets. It is meant to be a broad term that incorporates all types of data that are produced, stored and used by the control assessment system 100. RRD ratings 212, SoC ratings 214, PCD ratings 216, ILIS ratings 218, definition weights 220, scope weights 222, design weights 224, and process network graph(s) 120 are, in some embodiments, stored in the datastore 204, as shown in FIG. 2.

As explained above, in some implementations, data used by control assessment system 100 is input to an intermediary platform. In an example implementation any one of the RRD ratings, SoC ratings, PCD ratings and RCs, or combination thereof are input via a user interface of the tGRC platform 120 which, in turn, feeds the data to control assessment system 100.

In some embodiments, RRD ratings, SoC ratings, PCD ratings and RCs are stored in a non-transitory memory of the tGRC platform 128.

Generally, the control assessment system 100 operates to receive a network graph (e.g., process network graph 120) and the results of the above-described sub-assessments, including the RC ratings, the RRD ratings, the PCD ratings, the SoC rating and the ILIS ratings. This data is, in turn, used to determine an adequacy of a node (e.g., a process) in the network graph (e.g., the process network graph 120).

In an example implementation, the results of the sub-assessments are fed through a series of processes performed by the control assessment system 100 to arrive at a DIS 226, which can be stored in datastore 204. In turn, a corresponding ILIS rating 218 together with DIS 226 are used to determine InitCS, which also can be stored in datastore 204.

In an example implementation, leveling factor calculator 252 operates to determine a leveling factor according to a maximum possible score of the RRD rating, the SoC rating, and the PCD rating. The leveling factor is used in the calculation of DIS 226.

In an example embodiment, DIS calculator 246 operates to obtain the RRD rating 212, the SoC rating 214, and the PCD rating 216 from the RCM 122 and calculate DIS 226. In turn, initial control strength (InitCS) calculator 254 operates to calculate InitCS 130 based on the ILIS rating 218 and DIS 226. The control assessment system 100 can operate to store DIS 226 and InitCS 130 in datastore 204.

Subgraph generator 248 operates to generate n-subgraphs based on the network graph, which in this example application is a process network graph 120, where n is a number of nodes in the process network graph 120. An example subgraph is described below in more detail in connection with FIG. 14.

In some embodiments, the control assessment system 100 operates to receive a reliance coefficient (RC) rating representing a reliance of a node under test on a set of controls of upstream nodes to execute the set of controls. The control assessment system 100 also operates to store the reliance coefficient (RC) ratings 210 in datastore 204.

Modified control strength calculator 256 operates to calculate, for each node in a subgraph of the n-subgraphs, a modified control strength (ModCS) corresponding to a combination of InitCS and a weakening factor derived from a combination of a ModCS of a plurality of upstream nodes and RC ratings 210 of each node-to-node relationship of the plurality of upstream nodes.

In some embodiments, the data described herein and the results of the procedures can be stored (temporarily or persistently) in memory(ies) 208, which in all the embodiments described herein are non-transitory memory(ies). For example, one or more of the RC ratings 210, RRD ratings 212, SoC ratings 214, PCD ratings 216, ILIS ratings 218, definition weights 220, scope weights 222, design weights 224, DIS 226, InitCS 130, leveling factors, process network graph 120, and/or other data (e.g., the sensitivity ratings 230 and n-subgraphs, described below) can be stored in non-transitory memory(ies) 208.

Figure 3:
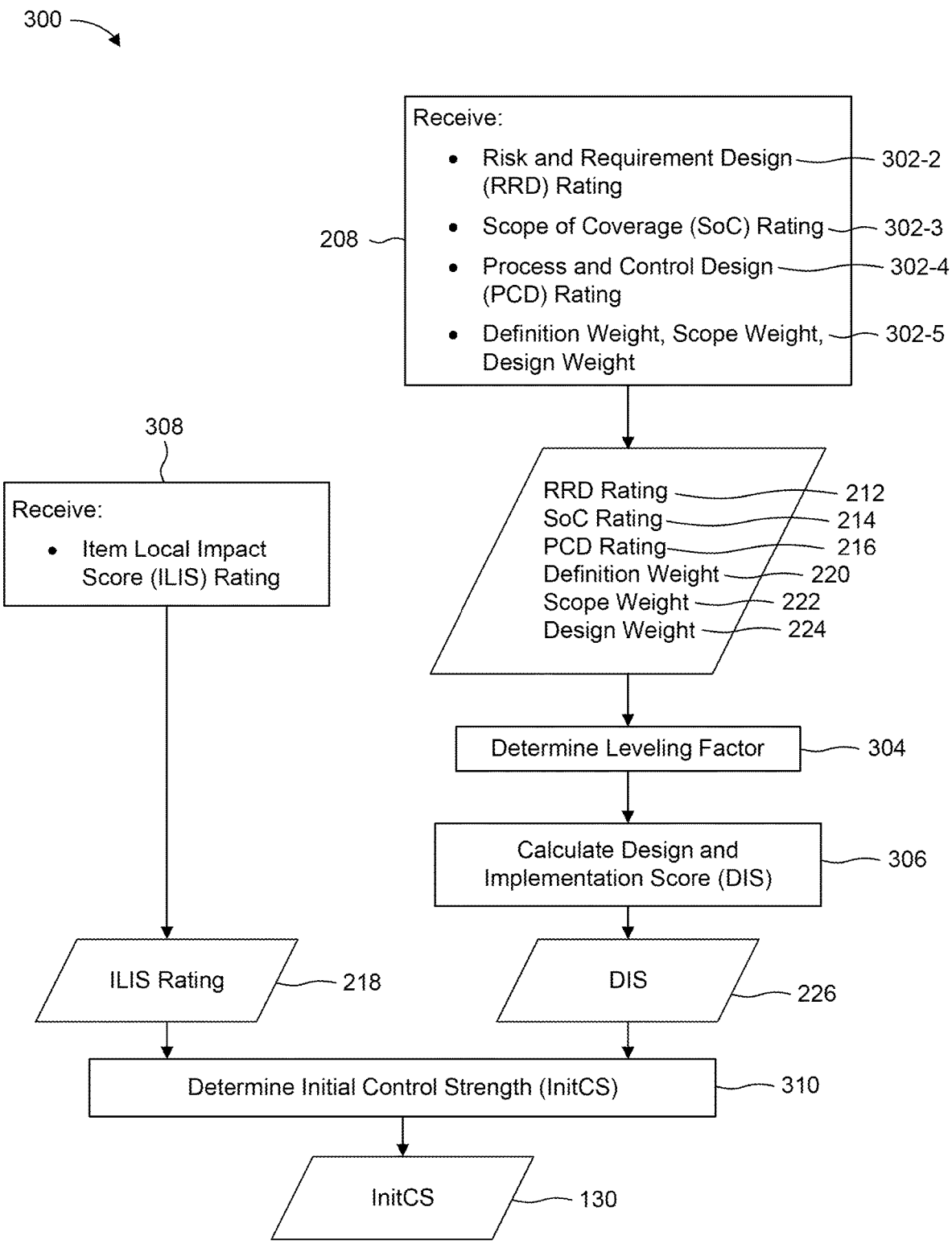
FIG. 3 depicts a procedure for determining an initial control strength (InitCS) in accordance with an example embodiment.

FIG. 3 depicts an initial control strength procedure 300 for determining an initial control strength (InitCS) in accordance with an example embodiment. In the example implementation shown in FIG. 3, initial control strength procedure 300 includes a subprocess for determining a design and implementation score (DIS) 226.

Initial control strength procedure 300 operates to perform several receiving operations (depicted in FIG. 3 as rating and weight receiving operation(s) 302) including a risk and requirement design rating receiving operation 302-2 that performs receiving a risk and requirement design (RRD) rating corresponding to how well a plurality of controls within the node under test covers at least one risk for that node; a scope of coverage rating receiving operation 302-3 that performs receiving a scope of coverage (SoC) rating corresponding to how well the set of controls within the node covers the intended scope of the node; a process and control design rating operation 302-4 that performs receiving a process and control design (PCD) rating corresponding to how well the set controls within the node (e.g., process) is designed, and a definition weight receiving operation 302-5 that performs receiving a definition weight (Def Weight) corresponding to the RRD rating, a scope weight (Scope Weight) corresponding to the SoC rating, and a design weight (Design Weight) corresponding to the PCD rating.

Initial control strength procedure 300 includes a leveling factor determining operation 304 that performs determining a leveling factor according to a maximum possible score of the RRD rating, the SoC rating, and the PCD rating. A design and implementation score (DIS) operation 306, in turn, performs calculating the DIS score 226 according to equation 2, as follows:

$$DIS = \frac{RRD * (Def \text{ Weight}) + SoC * (\text{Scope Weight}) + PCD * (\text{Design Weight})}{\text{Leveling Factor}} \quad (2)$$

The DIS 226 is a representation of the design effectiveness of a node (e.g., a process). In an example implementation, DIS calculator 246 operates to calculate DIS 226 according to equation (2) above.

In one example application, control assessment system 100 performs a risk mitigation procedure on at least one of the plurality of nodes based, in part, on DIS 226.

Initial control strength procedure 300 also performs a local impact score receiving operation 308 that performs receiving an item local impact score (ILIS) rating corresponding to how impactful documented issues are to the set of controls within the related node.

In some embodiments, one or more issue records or finding records are documented through various assessments. Individually and collectively, an issue record and finding record are referred to herein as an item record. An item record represents a known operating effectiveness problem related to a particular node (e.g., a particular process). One or more risk managers 104 assigns an ILIS rating, representing the impact of the item record on the relevant processes (i.e., nodes) in the process network graph 120. In turn, an initial control strength determination operation 310 performs determining InitCS 130 according to equation (3), as follows:

$$InitCS = DIS * \prod_{i=1}^{n}(1 - ILIS_i) \quad (3)$$

where n is an integer. In an example embodiment, InitCS is calculated by the initial control strength calculator 254. In an example implementation, the InitCS calculation occurs before the process network graph 120 is considered. That is, InitCS is a representation of the strength of a node (e.g., process) before considering any upstream dependencies. In one example application, control assessment system 100 performs a risk mitigation procedure on at least one of the plurality of nodes based, in part, on InitCS 130.

Figure 4:
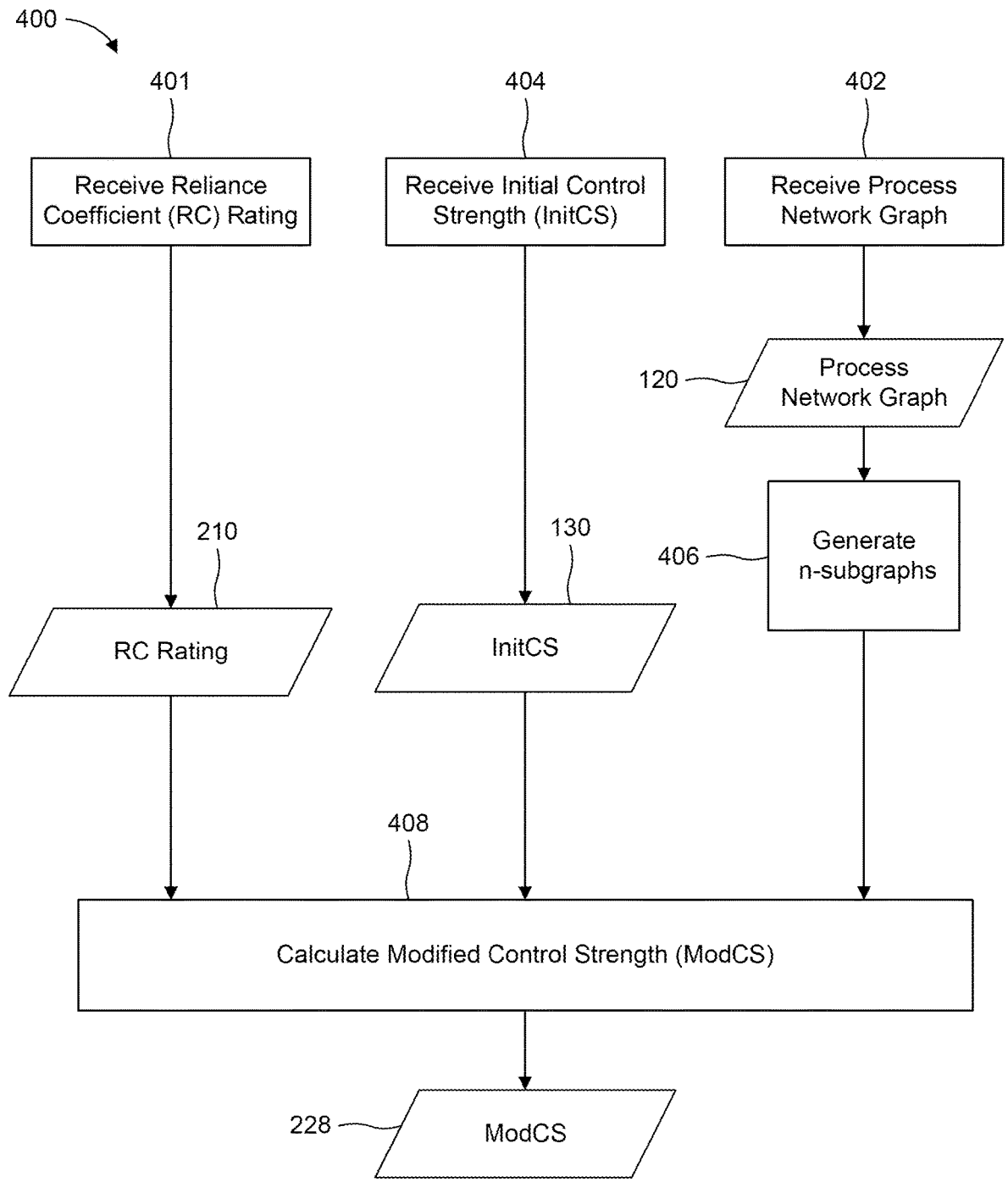
FIG. 4 depicts a procedure for calculating a modified control strength (ModCS) for each node represented by a network graph in accordance with an example embodiment.

FIG. 4 depicts a procedure for calculating a modified control strength (ModCS) 400 for each node represented by a network graph in accordance with an example embodiment. In this example application, each node represents a process and the network graph is a process network graph 120. As shown in FIG. 4, procedure 400 operates to perform receiving operations including a reliance coefficient receiving operation 401 that performs receiving a reliance coefficient (RC) rating representing a reliance of a node on a set of controls of upstream nodes to execute the set of controls of the node and a process network graph 120 receiving operation 402 that performs receiving a process network graph 120. The process network graph 120 has a plurality of nodes, each node associated with at least one process.

In some embodiments, the RC rating received before the process network graph 120. In some embodiments the network graph is received before the RC rating. In some embodiments, the process network graph 120 and RC rating are received in parallel or substantially in parallel.

An initial control strength receiving operation 404 performs receiving an initial control strength (InitCS) 130 corresponding to one or more controls performed by each of a plurality of nodes. InitCS 130 is generated, in some embodiments, as described above in connection with FIG. 3.

A subgraph is a part of a graph (in this example implementation, a process network graph 120). The subgraph is obtained by removing some nodes and/or branches of the graph. Thus, the number of branches and/or nodes of a subgraph will be less than the original graph. In an example implementation, each node of a subgraph has a maximum number of upstream nodes (e.g., 5). An n-subgraph generation operation 406 performs generating n-subgraphs based on the process network graph 120, where n is a number of nodes in the graph. In an example embodiment, subgraph generator 248 (FIG. 2) operates to construct the n-subgraphs. In an example implementation, the n-subgraphs are stored in memory(ies) 208 (FIG. 2).

Generally, in an example implementation, a representation of the weaknesses in upstream processes within a subgraph is combined with the RC ratings 210 of each upstream process to obtain a deficiency representation, where the deficiency representation corresponds to all the upstream processes within a subgraph.

More specifically, a modified control strength operation 408 performs calculating, for each node in a subgraph of the n-subgraphs, a modified control strength (ModCS) corresponding to a combination of InitCS 130 and a weakening factor derived from a combination of a ModCS of a plurality of upstream nodes and a reliance coefficient (RC) 210 of each node-to-node relationship of the plurality of upstream nodes.

By reducing the network graph to multiple subgraphs, infinite loops that would otherwise drive a ModCS score to zero, are eliminated.

In an example implementation, modified control strength (ModCS) 228 is calculated according to equation (4), as follows:

$$ModCS_p = InitCS_p - \frac{\Sigma_{i=1}^{n}\left[InitCS_p * (1 - ModCS_{pi-1}) * RC_{pi}^2\right]}{\Sigma_{i=1}^{n} RC_{pi}} \quad (4)$$

where p is the node (e.g., process) and p−1 represent the plurality of upstream nodes (e.g., processes). ModCS 232 is, in some embodiments, stored in the datastore 204, as shown in FIG. 2.

As explained above, the upstream nodes (e.g., upstream processes) are limited to upstream nodes in the subgraph being tested. Advantageously, limiting the number of upstream nodes to only those within a subgraph also prevents entering an infinite loop.

Also advantageously, ModCS is modeling a strength of a node given the node's position in the network graph, e.g., the process network graph 120.

In one example implementation, control assessment system 100 performs a risk mitigation process on at least one of the plurality of nodes based, in part, on ModCS 228.

Figure 5:
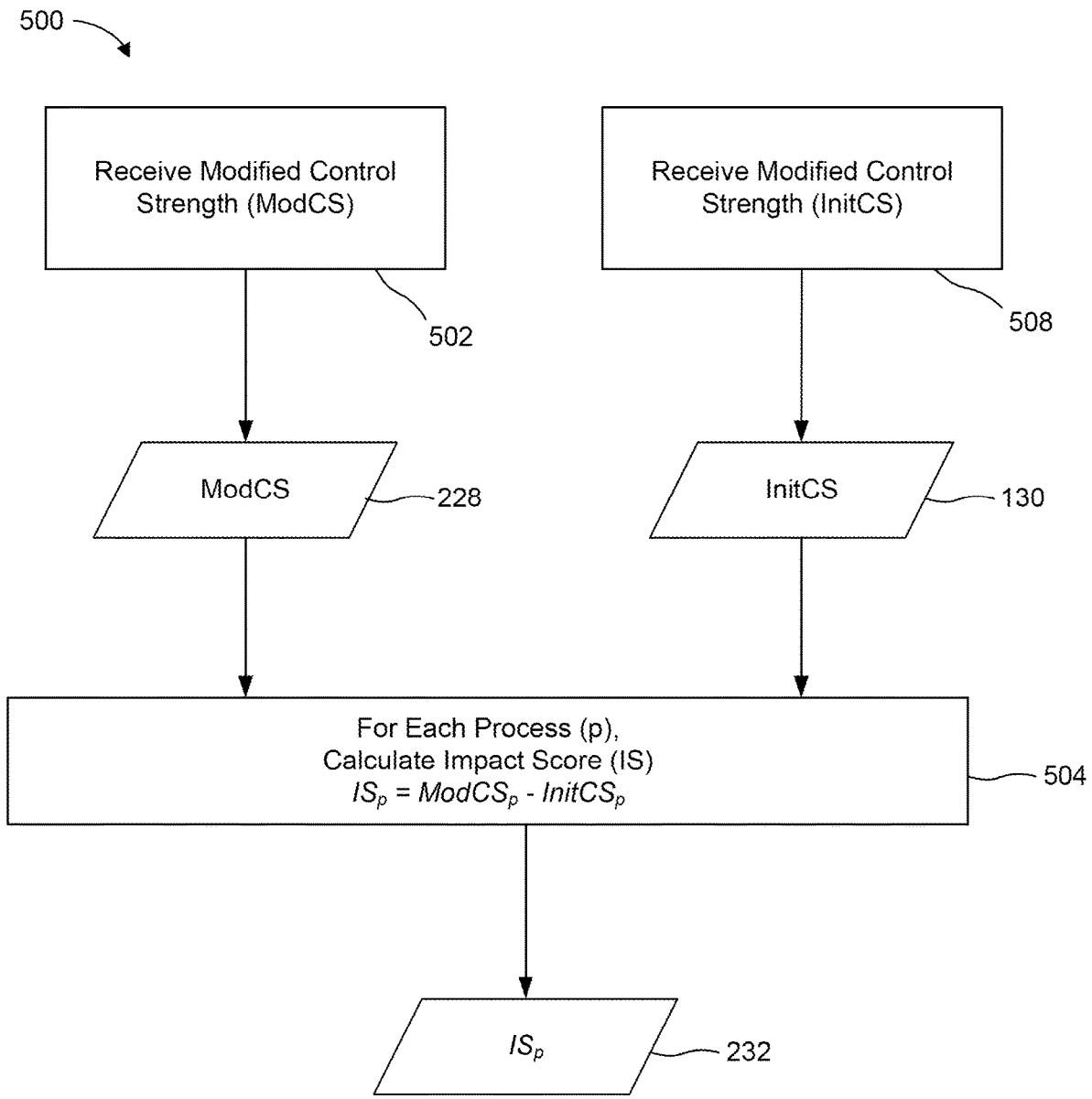
FIG. 5 depicts a procedure for calculating an impact score (IS) for each node represented by a network graph in accordance with an example embodiment.

FIG. 5 depicts a procedure 500 for calculating an impact score (IS) 232 for each node represented by a network graph in accordance with an example embodiment. In this example implementation, each node represents a process, and the network graph is a process network graph 120. A ModCS receiving operation 502 performs receiving a ModCS 228 for each process. An InitCS receiving operation 508 performs receiving a InitCS 130 for each process. In turn, an impact score calculation operation 504 performs calculating, for each node (e.g., process (p)) of the plurality of nodes an impact score (IS) according to equation (5), as follows:

$$IS_p = ModCS_p - InitCS_p \quad (5)$$

where the impact score (IS) 232 corresponds to an impact of any existing deficiencies on a node in the network. Particularly, IS 232 provides a degree to which a node (e.g., a process) is impacted by any deficiencies in upstream nodes (e.g., processes). In an example implementation, impact scorer 250 (FIG. 2) operates to calculate IS 232.

In an example implementation, the more negative the IS, the more impacted the node (e.g., process) is by any upstream deficiencies. This is useful in understanding which nodes (e.g., processes) suffer the most from problems upstream. IS 232 is, in some embodiments, stored in the datastore 204, as shown in FIG. 2.

Figure 12:
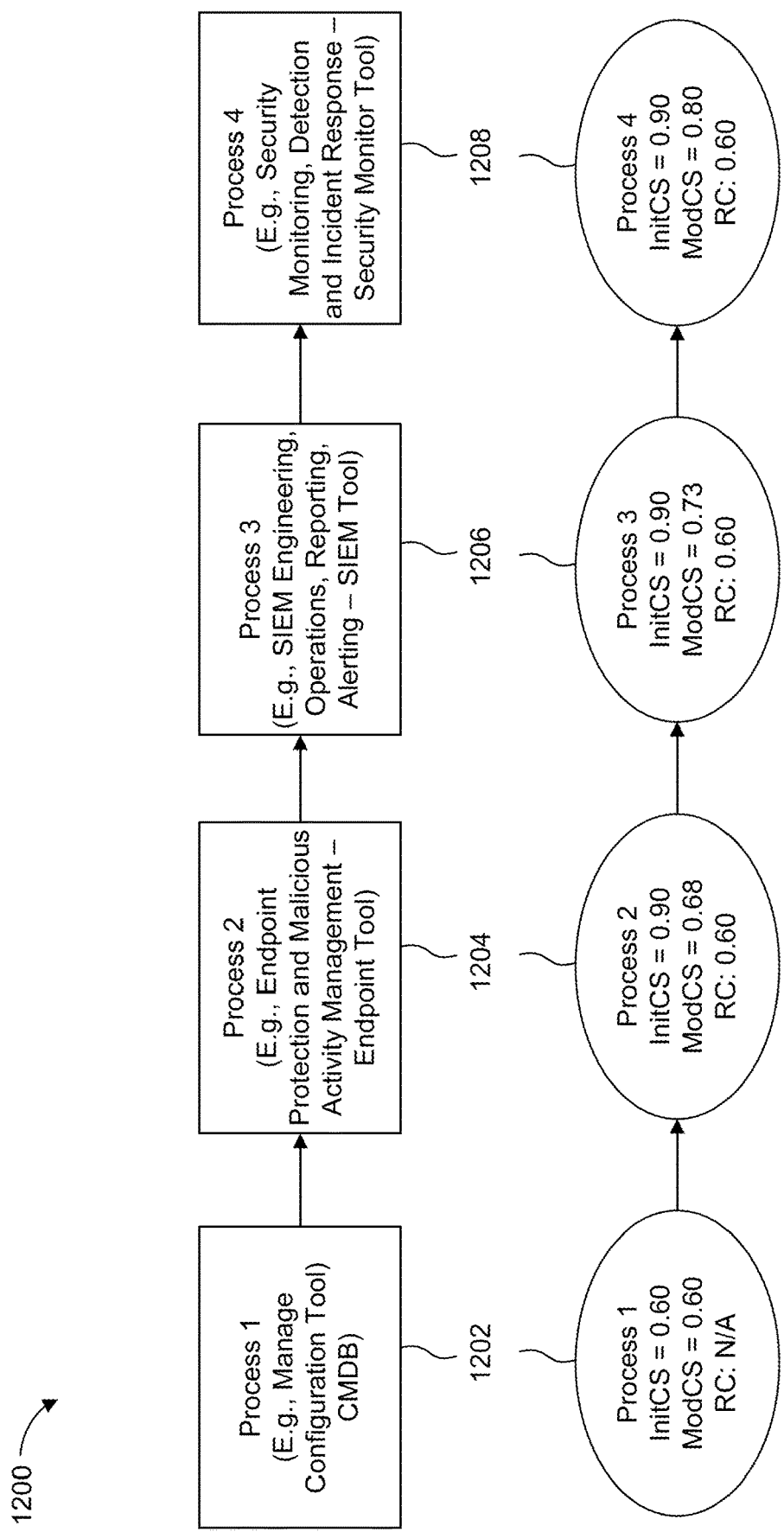
FIG. 12 illustrates a single-process reliance example.

FIG. 12 illustrates a single-process reliance example 1200 in accordance with an embodiment. A configuration management database (CMDB) contains relevant information about hardware and software components used in an organization's IT (information technology) services and the relationships between those components. Security information and event management (SIEM) combines security information management (SIM) and security event management (SEM) for the purposes of providing real-time analysis of security alerts generated by applications and network hardware. SIEM tools can also be used to log security data and generate reports for compliance purposes. As shown in FIG. 12, a management configuration tool 1202 supplies information stored in a CMDB, where the management configuration tool 1202 is operated at a node that is upstream from a node that operates an endpoint protection and malicious activity management tool, referred to simply as endpoint tool 1204. The node that operates the endpoint tool 1204 is upstream from a node that operates an SIEM engineering, operations, reporting and alerting tool, referred to as an SIEM tool 1206. The node that operates the SIEM tool 1206 is upstream from a node operating a security monitoring, detection and incident response tool, referred to as a security monitor tool 1208.

Management configuration tool 1202 executes a process, Process 1. Endpoint tool 1204 executes another process, Process 2. SIEM tool 1206 executes another process, Process 3. Security monitor tool 1208 executes another process, Process 4.

In this example use case, the nodes are each used to perform a process related to information security. For example, a response process executed by the security monitor tool 1208 may be dependent on the SIEM tool 1206, and the SIEM tool 1206 may be dependent on an array of security tools that feed it security-related information, such as the endpoint protection and malicious activity management tool, referred to as an endpoint tool 1204. An asset management process executed by the management configuration tool 1202 can also have an impact on where security tools such as the endpoint tool 1204, the SIEM tool 1206 and the security monitor tool 1208 are located within the network. An effectiveness level can therefore create a ceiling on how effective downstream processes can be.

As can be seen by the example illustrated in FIG. 12, the initial control strength of each process, i.e., the control strength of each process executed by the respective tool, without factoring upstream failures, results in an assessment that appears relatively better than when factoring failures that do factor upstream failures. For example, if the threshold for meeting a control threshold is 0.8, the initial control strengths (i.e., InitCS) of the endpoint process performed by the endpoint tool 1204, the SIEM process performed by SIEM tool 1206, and the security monitor process performed by security monitor tool 1208 all pass because they are greater than 0.8 (i.e., they are all 0.90). However, factoring in controls not working well in the CMDB process performed by the management configuration tool 1202 having an initial control strength of 0.6 (i.e., significantly below the control threshold of 0.8) results in drops in control strength of all downstream processes as illustrated by the modified control strength (i.e., ModCS) metric. Endpoint tool 1204 and SIEM tool 1206, in this example use case, now appear below an acceptable control strength threshold (e.g., 0.68 and 0.73, respectively). As illustrated by this example, understanding the relationships of the processes within the network provides more accurate (and hence useful) effectiveness rating.

Figure 13:
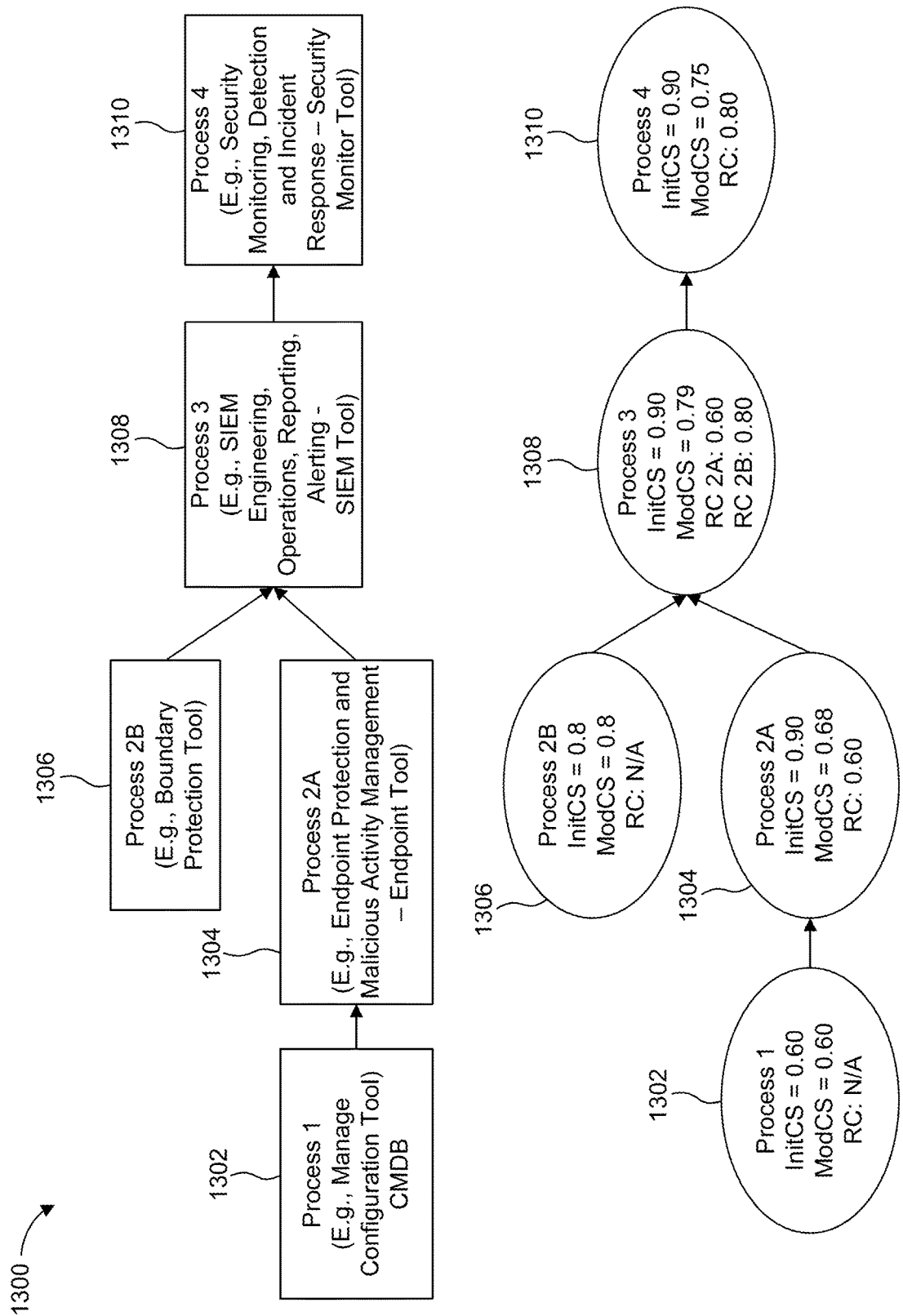
FIG. 13 illustrates a two-process reliance example.

FIG. 13 illustrates a two-process reliance example 1300 according to the embodiments described herein. As shown in FIG. 13, a management configuration tool 1302 supplies information stored in a CMDB from a node that is upstream from a node that operates an endpoint tool 1304. The node that operates the endpoint tool 1304 is upstream from a node that operates an SIEM tool 1308. The node that operates the SIEM tool 1308 is upstream from a node operating a security monitor tool 1310. In this example use case, SIEM tool 1308 is also downstream from a boundary protection tool 1306. Boundary protection tool 1306 monitors and controls communications at the external boundary of an information system to prevent and detect, for example, malicious and other unauthorized communication. Protection is achieved through the use of gateways, routers, firewalls, guards, and encrypted tunnels.

Management configuration tool 1302 executes a process, Process 1. Endpoint tool 1304 executes another process, Process 2A. SIEM tool 1308 executes another process, Process 3. Security monitor tool 1310 executes another process, Process 4. Boundary protection tool 1306 executes another process, Process 2B.

In this example use case, the nodes are each used to perform a process related to information security. For example, a response process executed by the security monitor tool 1310 may be dependent on the SIEM tool 1308, and the SIEM tool 1308 may be dependent on endpoint tool 1304 and boundary protection tool 1306. Management configuration tool 1302 can also have an impact on where security tools such as the endpoint tool 1304, the SIEM tool 1308 and the security monitor tool 1310 are located within the network. Similarly, boundary protection tool 1306 can also have an impact on where the endpoint tool 1304, the SIEM tool 1308 and the security monitor tool 1310 are located within the network. An effectiveness level can therefore create a ceiling on how effective downstream processes can be.

As can be seen by the example 1300 illustrated in FIG. 13, the initial control strength of each process, i.e., InitCS, the control strength of each process executed by the respective tool, without factoring upstream failures, results in an assessment that appears relatively better than when factoring failures that do factor upstream failures.

The RC ratings show the impact of deficiencies in the upstream processes. As shown in the example in FIG. 13, the process of SIEM tool 1308, Process 3 is affected by Process 2A and Process 2B differently. The RC rating with respect to Process 2A is 0.60 and the RC rating with respect to Process 2B is 0.80, meaning Process 3 is less reliant on Process 2A than it is on Process 2B.

As illustrated by the example depicted in FIGS. 12 and 13, understanding the relationships of the processes within the network provides more accurate (and hence useful) effectiveness rating. In some embodiments, a user interface is provided to present information in a similar format as depicted in the examples illustrated by FIGS. 12 and 13 enabling quick visualization of control strengths throughout a network, for the purpose of facilitating remediation. Accordingly, FIG. 12 and FIG. 13 may also be example screenshots of a tool for viewing process reliances in accordance with example aspects of the embodiments described herein.

Figure 14:
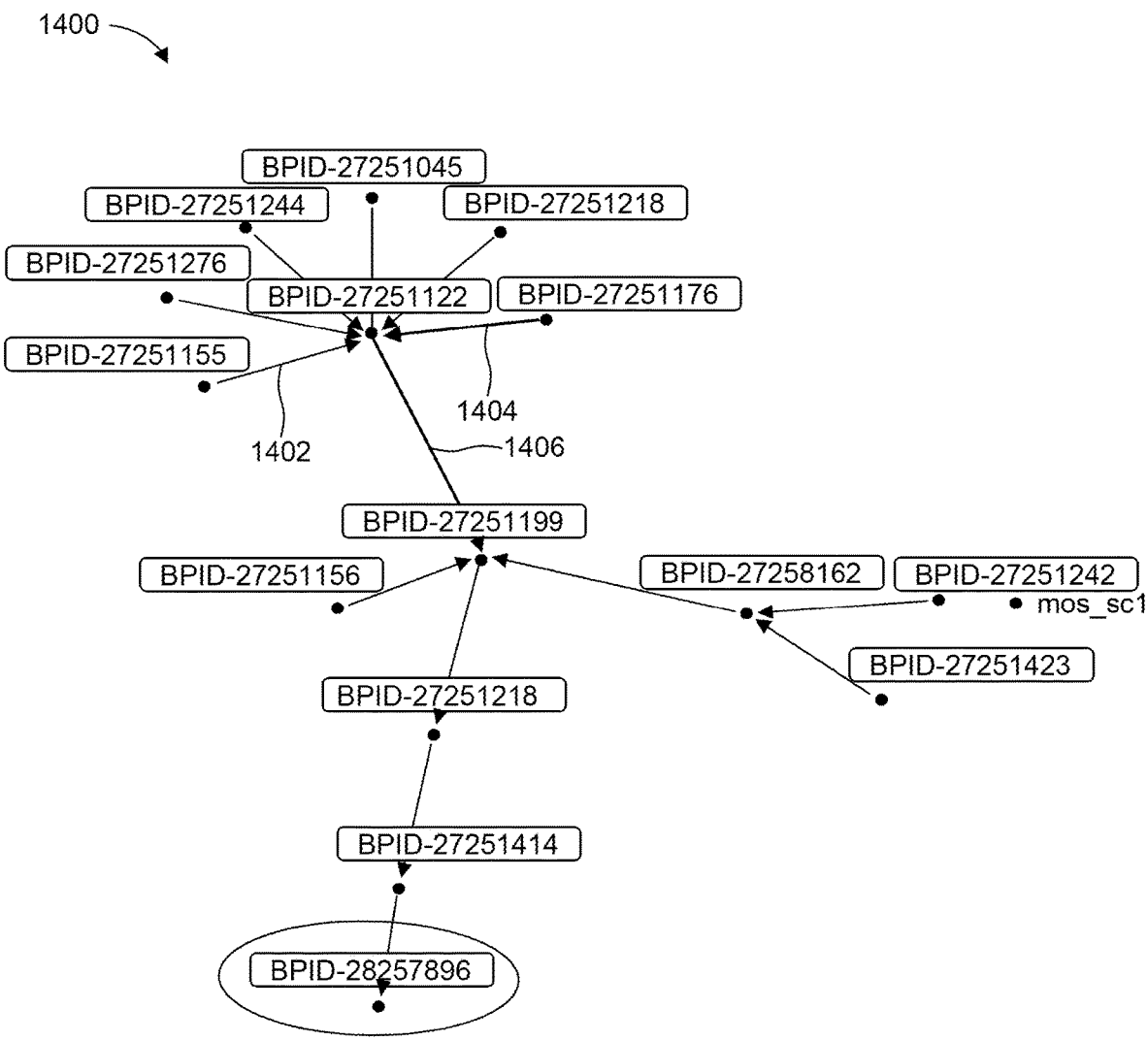
FIG. 14 illustrates a subgraph according to an example use case.

FIG. 14 illustrates a subgraph 1400 according to an example use case. The operations used to calculate modified control strengths (ModCS) described above are performed on the subgraphs such as subgraph 1400. To calculate ModCS, a network graph such as process network graph 120 is dissected into n-subgraphs, where n is the number of processes in the network. The particular node (e.g., process) being assessed is the node having the identifier: BPID-28257896. In an example implementation, subgraph generator 248 (FIG. 2) operates to construct a subgraph having the path to each node being the shortest path possible.

In an example limitation, each node has a maximum of five (5) nodes upstream. Using the shortest path prevents the subgraph from causing the procedures described herein to enter an infinite loop because it forces the path to terminate once it reaches the node. The levels of reliance between the nodes (e.g., processes) shown in FIG. 14 are represented by the levels of thickness of the connectors (also referred to as links) between two nodes (e.g., processes). The greater the thickness, the greater the level of reliance. For example, the nodes coupled by link 1402 have relatively less reliance than the nodes connected by link 1404, which in turn have less reliance than the nodes connected by link 1406. It should be understood that how the levels of reliance between the nodes (e.g., processes) are represented by the levels of thickness in subgraph 1400 are for illustration purposes.

In an example use case, all the nodes depicting processes are downstream from the node (e.g., process) having a configuration management database (CMDB).

Once the subgraph is constructed, the operations that compute ModCS described above are applied starting at the leaf nodes, then descend down the branches until the node being solved for is reached. The result of this subgraph is then used in the other-n subgraphs to calculate ModCS for the other n−1 nodes (e.g., processes).

Table 1 below illustrates example InitCS and ModCS ratings bounds.

TABLE 1

|  | Low Bound | High Bound |
| --- | --- | --- |
| Weak | 0 | 0.399 |
| Improvements Needed | 0.4 | 0.665 |
| Satisfactory | 0.666 | 0.899 |
| Strong | 0.9 | 1 |

For example, a weak node (e.g., process) is one having a control strength having a predetermined low bound (e.g., 0) and a predetermined high bound (e.g., 0.399.) A node (e.g., process) not meeting the threshold defined by the predetermined low bound and the predetermined high bound indicates that the node can have a negative impact. Other predetermined thresholds can be used to indicate other levels of control strength, e.g., improvements needed, satisfactory, and strong, as illustrated in Table 1 above.

As described above, rather than attempt to solve for all the nodes (e.g., processes) in the network graph (e.g., process network graph 120) at one time, in some embodiments, control strength is solved locally for an individual node in the network graph with respect to a predetermined number of nodes of the graph. In one implementation, solving locally means solving for n (e.g., 5) nodes distant from the node being measured, where n is an integer. The network graph is then reduced to remove infinite loops by using a shortest path to every related process. Each individual node in the graph is cycled through so that several subgraphs are determined. The control strength for each node in each subgraph is measured. The results for each subgraph are then aggregated. The network graph further shows input nodes (e.g., input processes) and output nodes (e.g., output processes). An input node (e.g., input process) accepts input data from a data source and performs some actions on the data. An output node (e.g., output process) is a node (e.g., process) that provides results generated after the processing of data. Any weakness in the configuration management database results in a negative impact to the downstream nodes (e.g., processes) relying on the data the management configuration tool supplies.

Detecting multiple control strengths for multiple nodes that are related can be used to determine which node in the network graph will cause the greatest cascade effect. That is which nodes are the most sensitive. The most sensitive processes are the ones that have relatively strong relationships with the nodes (e.g., processes) downstream. "Sensitive" means that if that a node (e.g., process) does deteriorate, the impact on the overall network would be large. For example, if a sensitive node (e.g., a sensitive process) suddenly becomes weaker, that sensitive node will have more of an impact on the overall network, and nodes that are downstream from the sensitive node. Consequently, a Modified control strength (ModCS) of a node (e.g., a process), which corresponds to the control effectiveness of a node after considering weaknesses associated with certain upstream nodes will change accordingly. It should be understood that sensitivity and control strength of a given node are not necessarily correlated. In some embodiments there is no correlation. In some embodiments there is correlation. Sensitivity is related to how sensitive a node is to downstream nodes whereas control strength is related to the control effectiveness of the node.

In an example embodiment, a test for sensitive nodes (e.g., sensitive processes) is performed. In an example implementation, initially, ModCS for each node in a network is calculated. The average (E.g., mean average) of all the ModCS calculations is then determined to obtain an average ModCS. In turn, a change is made to one node in the network by, for example, dropping the initial control strength of the node by a predetermined constant, such as by 0.1. In turn, the average ModCS is calculated again (i.e., recalculated) for the entire network. The node that causes the average ModCS to change the most is determined to be the most sensitive node.

Figure 15:
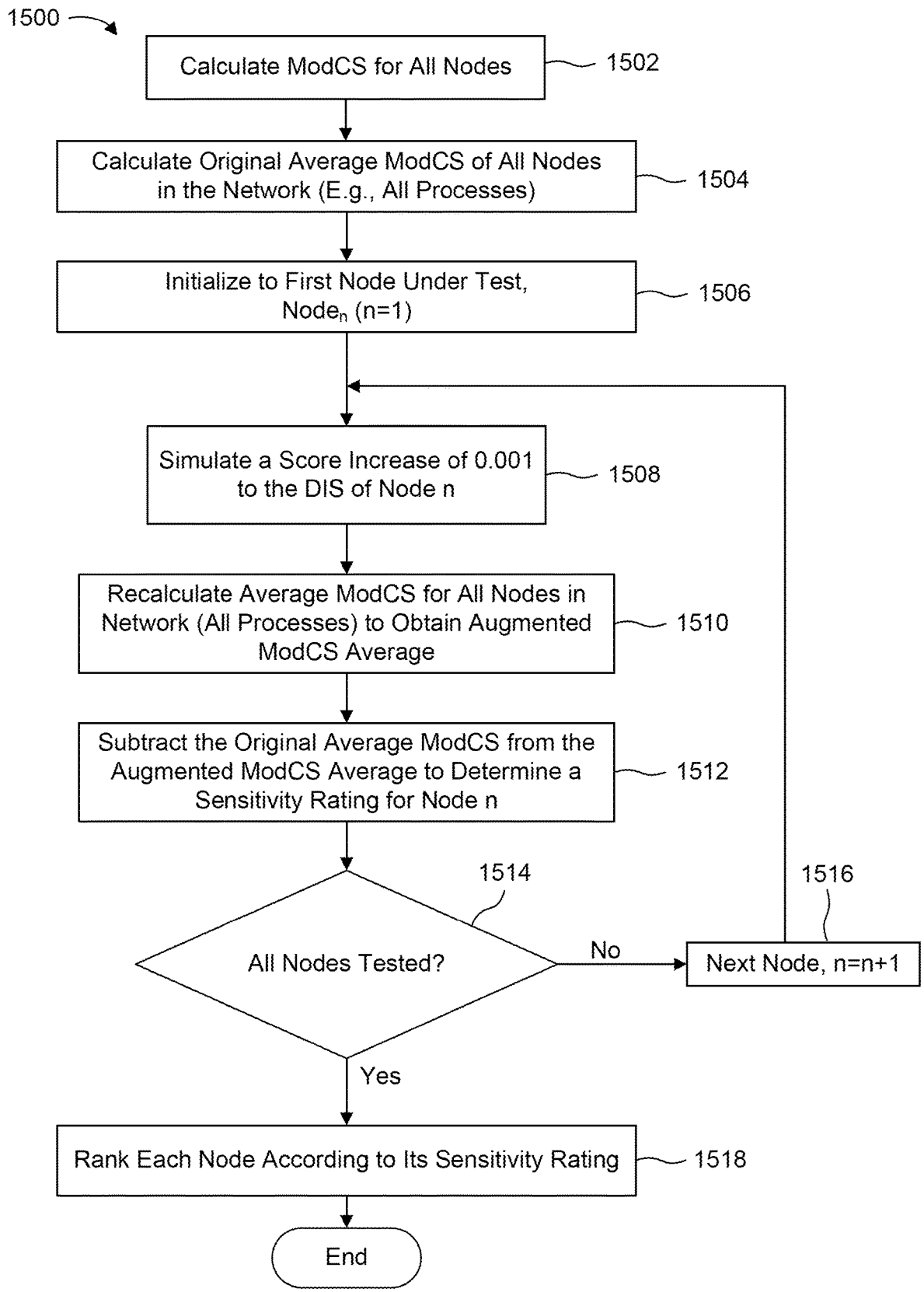
FIG. 15 is a flowchart illustrating a node sensitivity ranking procedure for ranking node sensitivities in accordance with an example embodiment.

FIG. 15 is a flowchart illustrating a node sensitivity ranking procedure 1500 for ranking node sensitivities according to an example embodiment. In an example application, remediation can be prioritized based on the relative sensitivities of the nodes under test, which are represented by the rankings. In some embodiments, the control assessment system 100 performs a ranking communication operation that performs communicating the results of the node sensitivity ranking procedure 1500 (e.g., via input/output interface 206, such as a network interface) to a remediation system (not shown) to cause the remediation system to prioritize remediation of nodes based on the rankings.

A ModCS calculation operation 1502 performs calculating ModCS for each node n in the network. In turn, a ModCS averaging operation 1504 performs averaging all the node ModCS values to obtain an original average ModCS.

Each node n in the network (i.e., represented by a network graph such as process network graph 120) is then modified one at a time. An initialization operation 1506 performs initializing to a particular node to test for one of the nodes in the network, which for convenience is identified as the first node (n=1).

In this example implementation, each node in the network is improved by improving the DIS score. As explained above, DIS is a representation of the design effectiveness of a node (e.g., a process). In some embodiments a score related to a selected node in the network is adjusted by an adjusting step. The result of the adjusting is an adjusted score. In this example implementation, a score increase operation 1508 performs increasing the DIS score (e.g., by 0.001). In turn, an average ModCS recalculation operation 1510 performs recalculating the average ModCS corresponding to all the nodes to obtain an augmented ModCS.

The augmented ModCS corresponding to each change is then compared to the original ModCS calculated without the change (i.e., in ModCS averaging operation 1504). In one example implementation, a subtraction operation 1512 performs subtracting the original average ModCS from the augmented ModCS average to determine a sensitivity rating for the node under test (i.e., node n).

A determination operation 1514 is performed to check whether a change in all the nodes has been simulated. If not, another node in the network is tested as shown by operation 1516 (n=n+1). Next node operation 1516 performs incrementing the node under test by sequentially testing each node. It should be understood, however, that next node operation 1516 can select another node to be tested by selecting that other node in a different manner (e.g., randomly or pseudo randomly).

If the determination operation 1514 determines that all of the nodes have been tested (e.g., that a change in the DIS for each node has been independently simulated), then a ranking operation 1518 performs ranking all the nodes n according to their sensitivity ratings. By testing each node in the network in this manner, the node that has the most impact on the overall network can be determined.

In some embodiments, process 1500 is performed for each of the n-subgraphs in a network graph such as process network graph 120.

It should be understood that the change in node can be a degradation instead of an improvement and still be within scope of the embodiments described herein. Similarly, a specific improvement (or degradation) in a node can be simulated to determine how the improvement or degradation impacts the network (e.g., downstream nodes). In this example simulation a node (e.g., a process) has several issues mapped to it and, therefore, several ILIS scores. The simulation provides how a resolution of a specific issue would improve downstream nodes or the overall network. Advantageously, such a simulation can provide simulations of improvements in downstream nodes due to resolution of a specific issue upstream, improvement in downstream nodes due to improvement in the Scope of Coverage (SoC) of an upstream node, and a negative impact on downstream nodes if an issue of a given severity is developed upstream.

One technical challenge resolved by the systems, methods and computer products described herein involves solving for control strength in a system such as the one illustrated by process network graph 120 in FIG. 6, which contains an infinite loop. An infinite loop, for example, can be where a process, such as process A depends on process B which in turn depends on process C which depends on process A. An infinite loop can drive most, and possibly all, of the ModCS scores to zero. Calculating aggregate control strength for nodes in a network graph that form an infinite node create several challenges as the values of prior nodes used to calculate control strength could negatively affect the aggregate control strength. As explained above, measuring the control strength of each node in a network graph with respect to a predetermined number of related nodes (i.e., a subgraph), cycling through each node in the network graph in the same manner enables the most sensitive processes to be located.

In another example application, ModCS 228 and/or InitCS 130 can be used to identify problem areas within a network node. In an example implementation, each node represents a technology process (e.g., boundary protection support, firewall engineering, manage configuration, and the like). Nodes that are highly sensitive are identified by performing sensitivity ranking. The output can be used to identify problematic processes (e.g., ones with relatively low ModCS or InitCS scores) that are highly sensitive (high sensitivity rankings) to prioritize which nodes to perform remediation activities, thereby improving the ModCS and InitCS. In an example use case, highly sensitive but problematic processes can be prioritized to more efficiently provide the greatest overall benefit to the network.

In an example scenario, an information technology assets management process has low InitCS/ModCS score and is highly sensitive. The following remediation process could take place. The process initially performs tracing the low score back through the model. In an example situation, the RRD (risk coverage) score is low, leading to the low final InitCS and ModCS scores. The low RRD score could be due to the absence of controls addressing risks related to detection of unauthorized software. To remediate, the process owner of the information technology assets management process could, for example, be notified (e.g., automatically by control assessment system 100) to implement a control activity to monitor systematically for software that is not on the whitelist of allowed software. Once the control is implemented, it is likely the RRD score will increase due to full risk coverage. As a result, the InitCS and ModCS scores may very well improve.

In another example scenario, an application code scanning process has low InitCS/ModCS score and is highly sensitive. The following remediation process could take place. The process initially performs tracing the low score back through the model and, in this example, the SoC (scope of asset/technology coverage) score is found to be low, leading to a low final/InitCS/ModCS. The low SoC score is due to missing controls ensuring all of the applications that require scanning are indeed being scanned. To remediate, the application code scanning process owner is (automatically) notified by the control assessment system to implement a control to manually verify that scans month-over-month are covering all the applications that fit the criteria requiring application scanning. Once they implement the control, the SoC score will likely increase due to full scope of asset/tech coverage, and the InitCS/ModCS score improves.

In another example application, a control strength for each node involved in a mapping to a framework is determined. The control strengths for the nodes are compiled and mapped to at least one component of the framework, thereby generating an effectiveness rating for each component of the framework. The effectiveness rating for each component of the framework can be automatically presented (e.g., communicated over a network) to a remediation system to cause a process owner to perform risk mitigation.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random-access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine-accessible or machine-readable medium may be used to program a computer system or other electronic device. The machine-readable medium may include, but is not limited to, optical disks, CD-ROMs, and magneto-optical disks or other type of media/machine—readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

It should be understood that not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A method for modeling control strength of network nodes of a network, comprising the steps of:
   receiving a network graph having a plurality of nodes;
      receiving, for each respective node of the plurality of nodes:
         a risk and requirement design (RRD) rating corresponding to how well a set of controls within the respective node covers at least one risk for the respective node,
         a scope of coverage (SoC) rating corresponding to how well the set of controls within the respective node covers an intended scope of the respective node,
         a process and control design (PCD) rating corresponding to how well the set of controls within the respective node is designed, and
         a definition weight (Def Weight) corresponding to the RRD, a scope weight (Scope Weight) corresponding to the SoC rating, and a design weight (Design Weight) corresponding to the PCD rating;
   determining a leveling factor according to a maximum possible score of the RRD rating, the SoC rating, and the PCD rating;
   calculating a design and implementation (DIS) score for each of the plurality of nodes according to:

$$DIS = \frac{RRD*(Def\ Weight) + SoC*(Scope\ Weight) + PCD*(Design\ Weight)}{Leveling\ Factor};$$

and
   causing a risk mitigation process to be performed on at least one of the plurality of nodes based, in part, on DIS.

2. The method according to claim 1, further comprising:
   determining a ranking of node sensitivities for each respective node based, in part, on DIS; and
   wherein the risk mitigation process is based on the ranking.

3. The method according to claim 1, further comprising:
   receiving an item local impact score (ILIS) rating representing how impactful documented issues are to the set of controls within the respective node;
   calculating an initial control strength (InitCS) according to:

$$InitCS = DIS * \prod_{i=1}^{n}(1 - ILIS_i)$$

wherein the initial control strength (InitCS) corresponds to all controls performed by the respective node and i is an index between 1 and n, where n represents a number of nodes in the network graph; and
   causing a risk mitigation process to be performed on at least one of the plurality of nodes based, in part, on InitCS.

4. The method according to claim 3, further comprising:
   determining a ranking of node sensitivities for each respective node based, in part, on InitCS; and
   wherein the risk mitigation process is based on the ranking.

5. The method according to claim 3, further comprising:
   generating n-subgraphs based on the network graph, where n is the number of nodes in the network graph; and
   calculating, for each respective node in a subgraph of the n-subgraphs, a modified control strength (ModCS) corresponding to a combination of the InitCS, a weakening factor derived from a combination of a ModCS of a plurality of upstream nodes, and a reliance coefficient (RC) of each node-to-node relationship of the plurality of upstream nodes.

6. The method according to claim 3, further comprising:
   receiving a reliance coefficient (RC) rating representing a reliance of the respective node on a set of controls of upstream nodes to execute the set of controls of the respective node;
   calculating a modified control strength (ModCS) according to:

$$ModCS_p = InitCS_p - \frac{\sum_{i=1}^{n}\left[InitCS_p * (1 - ModCS_{pi-1}) * RC_{pi}^2\right]}{\sum_{i=1}^{n}RC_{pi}}$$

wherein $ModCS_p$ represents a strength of a node (p) in the network graph, p−1 represents the plurality of upstream nodes, the plurality of upstream nodes being limited to upstream nodes in the subgraph being tested, $InitCS_p$ represents an initial control strength corresponding to all controls performed by the node (p), $RC_{pi}$ represents a reliance coefficient rating for the node (p), i represents an index between 1 and n, and n represents the number of nodes in the network graph; and causing a risk mitigation process to be performed on at least one of the plurality of nodes based, in part, on $ModCS_p$.

7. The method according to claim 6, further comprising:
determining a ranking of node sensitivities for each respective node based, in part, on $ModCS_p$; and
wherein the risk mitigation process is based on the ranking.

8. The method according to claim 7, further comprising:
calculating, for each respective node (p) of the plurality of nodes an impact score (IS) according to:

$$IS_p = ModCS_p - InitCS_p,$$

wherein the impact score (IS) corresponds to an impact by at least one existing upstream deficiency on a node in the network graph.

9. A method according to claim 6, further comprising:
calculating a modified control strength (ModCS) value for each respective node in the network graph, thereby generating a plurality of node ModCS values;
averaging the plurality of node ModCS values to obtain an original average ModCS;
adjusting a score associated with a selected node in the network graph, thereby generating an adjusted score;
recalculating the original average ModCS using the adjusted score to obtain an augmented ModCS;
subtracting the original average ModCS from the augmented ModCS average to determine a sensitivity rating for the selected node;
performing the adjusting, recalculating and subtracting for each respective node in the network, thereby generating a plurality of sensitivity ratings; and
ranking each respective node in the network graph according to the plurality of sensitivity ratings.

10. A system for modeling control strength of network nodes in a network, comprising:
a control assessment system configured to:
receive a network graph having a plurality of nodes;
receive, for each respective node of the plurality of nodes:
a risk and requirement design (RRD) rating corresponding to how well a set of controls within the respective node covers at least one risk for the respective node,
a scope of coverage (SoC) rating corresponding to how well the set of controls within the respective node covers an intended scope of the respective node,
a process and control design (PCD) rating corresponding to how well the set of controls within the respective node is designed, and
a definition weight (Def Weight) corresponding to the RRD, a scope weight (Scope Weight) corresponding to the SoC rating, and a design weight (Design Weight) corresponding to the PCD rating;
determine a leveling factor according to a maximum possible score of the RRD rating, the SoC rating, and the PCD rating;
calculate a design and implementation (DIS) score for each of the plurality of nodes according to:

$$DIS = \frac{RRD*(Def\ Weight) + SoC*(Scope\ Weight) + PCD*(Design\ Weight)}{Leveling\ Factor};$$

and
cause a risk mitigation process to be performed on at least one of the plurality of nodes based, in part, on DIS.

11. The system according to claim 10, wherein the control assessment system is further configured to:
determine a ranking of node sensitivities for each respective node based, in part, on DIS; and
wherein the risk mitigation process is based on the ranking.

12. The system according to claim 10, wherein the control assessment system is further configured to:
receive an item local impact score (ILIS) rating representing how impactful documented issues are to the set of controls within the respective node;
calculate an initial control strength (InitCS) according to:

$$InitCS = DIS * \prod_{i=1}^{n}(1 - ILIS_i)$$

wherein the initial control strength (InitCS) corresponds to all controls performed by the respective node and i is an index between 1 and n, where n represents a number of nodes in the network graph; and
cause a risk mitigation process to be performed on at least one of the plurality of nodes based, in part, on InitCS.

13. The system according to claim 12, wherein the control assessment system is further configured to:
determine a ranking of node sensitivities for each respective node based, in part, on InitCS; and
wherein the risk mitigation process is based on the ranking.

14. The system according to claim 12, wherein the control assessment system is further configured to:
generate n-subgraphs based on the network graph, where n is the number of nodes in the network graph; and
calculate, for each respective node in a subgraph of the n-subgraphs, a modified control strength (ModCS) corresponding to a combination of the InitCS, a weakening factor derived from a combination of a ModCS of a plurality of upstream nodes, and a reliance coefficient (RC) of each node-to-node relationship of the plurality of upstream nodes.

15. The system according to claim 12, wherein the control assessment system is further configured to:
receive a reliance coefficient (RC) rating representing a reliance of the respective node on a set of controls of upstream nodes to execute the set of controls of the respective node;
calculate a modified control strength (ModCS) according to:

$$ModCS_p = InitCS_p - \frac{\sum_{i=1}^{n}\left[InitCS_p * (1 - ModCS_{pi-1}) * RC_{pi}^2\right]}{\sum_{i=1}^{n}RC_{pi}}$$

wherein $ModCS_p$ represents a strength of a node (p) in the network graph, p−1 represents the plurality of upstream nodes, the plurality of upstream nodes being limited to upstream nodes in the subgraph being tested, $InitCS_p$ represents an initial control strength corresponding to all controls performed by the node (p), $RC_{pi}$ represents a reliance coefficient rating for the node (p), i represents an index between 1 and n, and n represents the number of nodes in the network graph; and cause a risk mitigation process to be performed on at least one of the plurality of nodes based, in part, on $ModCS_p$.

16. The system according to claim 15, wherein the control assessment system is further configured to:

determine a ranking of node sensitivities for each respective node based, in part, on $ModCS_p$; and wherein the risk mitigation process is based on the ranking.

17. The system according to claim 16, wherein the control assessment system is further configured to:

calculate, for each respective node (p) of the plurality of nodes an impact score (IS) according to:

$$IS_p = ModCS_p - InitCS_p,$$

wherein the impact score (IS) corresponds to an impact by at least one existing upstream deficiency on a node in the network graph.

18. A system according to claim 15, wherein the control assessment system is further configured to:

calculate a modified control strength (ModCS) value for each respective node in the network graph, thereby generating a plurality of node ModCS values;

average the plurality of node ModCS values to obtain an original average ModCS;

adjust a score associated with a selected node in the network graph, thereby generating an adjusted score;

recalculate the original average ModCS using the adjusted score to obtain an augmented ModCS;

subtract the original average ModCS from the augmented ModCS average to determine a sensitivity rating for the selected node;

perform the adjusting, recalculating and subtracting for each respective node in the network to generate a plurality of sensitivity ratings; and rank each respective node in the network graph according to the plurality of sensitivity ratings.

19. A non-transitory computer-readable medium having stored thereon sequences of instructions, the sequences of instructions including instructions which when executed by one or more processors causes the at least one or more processors to perform:

receiving a network graph having a plurality of nodes;

receiving, for each respective node of the plurality of nodes:

a risk and requirement design (RRD) rating corresponding to how well a set of controls within the respective node covers at least one risk for the respective node;

a scope of coverage (SoC) rating corresponding to how well the set of controls within the respective node covers an intended scope of the respective node;

a process and control design (PCD) rating corresponding to how well the set of controls within the respective node is designed;

a definition weight (Def Weight) corresponding to the RRD, a scope weight (Scope Weight) corresponding to the SoC rating, and a design weight (Design Weight) corresponding to the PCD rating;

determining a leveling factor according to a maximum possible score of the RRD rating, the SoC rating, and the PCD rating;

calculating a design and implementation (DIS) score for each of the plurality of nodes according to:

$$DIS = \frac{RRD*(Def\ Weight) + SoC*(Scope\ Weight) + PCD*(Design\ Weight)}{Leveling\ Factor};$$

and causing a risk mitigation process to be performed on at least one of the plurality of nodes based, in part, on DIS.

20. The non-transitory computer-readable medium of claim 19, further having stored thereon a sequence of instructions for causing the one or more processors to perform:

determining a ranking of node sensitivities for each respective node based, in part, on DIS; and wherein the risk mitigation process is based on the ranking.

* * * * *